(12) United States Patent
Takano

(10) Patent No.: US 8,417,052 B2
(45) Date of Patent: Apr. 9, 2013

(54) INSTRUCTION SYSTEM, INSTRUCTION APPARATUS, AND COMPUTER READABLE MEDIUM

(75) Inventor: Kentaro Takano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 950 days.

(21) Appl. No.: 12/496,718

(22) Filed: Jul. 2, 2009

(65) Prior Publication Data

US 2010/0073543 A1  Mar. 25, 2010

(30) Foreign Application Priority Data

Sep. 25, 2008  (JP) .................................. 2008-246359

(51) Int. Cl.
*G06K 9/40* (2006.01)

(52) U.S. Cl.
USPC ............................ 382/274; 382/174; 382/255

(58) Field of Classification Search .................. 382/274, 382/174, 255
See application file for complete search history.

(56) References Cited

U.S. PATENT DOCUMENTS

| | | | | |
|---|---|---|---|---|
| 5,969,754 | A * | 10/1999 | Zeman | 348/136 |
| 6,962,416 | B2 * | 11/2005 | Ohara | 353/70 |
| 7,106,902 | B2 * | 9/2006 | Nakazawa et al. | 382/182 |
| 7,343,026 | B2 * | 3/2008 | Niwa et al. | 382/103 |
| 7,486,804 | B2 * | 2/2009 | Nakamura et al. | 382/106 |
| 7,532,766 | B2 * | 5/2009 | Chauville et al. | 382/254 |
| 7,949,202 | B2 * | 5/2011 | Matsuda | 382/275 |
| 2006/0168532 | A1 | 7/2006 | Stevens et al. | |
| 2007/0171283 | A1 | 7/2007 | Shingu | |

FOREIGN PATENT DOCUMENTS

| | | |
|---|---|---|
| JP | 10-207681 A | 8/1998 |
| JP | 2001-307117 A | 11/2001 |
| JP | 2006-072879 A | 3/2006 |
| JP | 2006-209747 A | 8/2006 |
| JP | 2007-226766 A | 9/2007 |

OTHER PUBLICATIONS

Japanese Office Action dated Mar. 29, 2011, corresponding to Japanese Patent Application No. 2008-246359.

* cited by examiner

*Primary Examiner* — Simon Sing
(74) *Attorney, Agent, or Firm* — Sughrue Mion, PLLC

(57) ABSTRACT

An instruction system including: a capture device; a projection device; a control device including: a judgment portion that judges visibility of an annotation image; a specifying portion that specifies a projection mode of the annotation image from projection modes of the annotation image stored into a storage portion, based on a result of the judgment; a notification portion that notifies the projection mode specified by the specifying portion; and a projection control portion that causes the projection device to project the annotation image corresponding to an instruction on the basis of the projection mode notified from the notification portion; and a terminal including: a reception portion receiving the captured image, and the projection mode notified from the notification portion; and a transmission portion transmitting the instruction on the basis of the received captured image, and the instruction on the basis of the notified projection mode, to the control device.

12 Claims, 21 Drawing Sheets

FIG. 12

| IDENTIFICATION INFORMATION FOR JUDGMENT | CAUSE | PROJECTION MODE |
|---|---|---|
| 001 | ANNOTATION IMAGE IS SMALL AND BAD SIZE | ENLARGE AND PROJECT ANNOTATIOM IMAGE |
| 002 | ANNOTATION IMAGE IS POINT OR THE LIKE, SMALL, AND BAD SIZE | EMPHASIZE ANNOTATIOM IMAGE WITH MOVING IMAGE |
| 003 | PROJECTION COLOR OF ANNOTATION IMAGE IS CLOSE TO COLOR OF INDICATED OBJECT, AND BAD COLOR | CHANGE PROJECTION COLOR |
| . . . | . . . | . . . |

US 8,417,052 B2

INSTRUCTION SYSTEM, INSTRUCTION APPARATUS, AND COMPUTER READABLE MEDIUM

CROSS-REFERENCE TO RELATED APPLICATION

This application is based on and claims priority under 35 USC 119 from Japanese Patent Application No. 2008-246359 filed Sep. 25, 2008.

BACKGROUND

1. Technical Field

This invention relates to an instruction system, an instruction apparatus, and a computer readable medium.

2. Related Art

In a conference system, various instructions such as an instruction of a work sequence have to be transmitted from a terminal side to an object side. As such a conference system that can transmit the instructions from the terminal side to the object side, there has been known an instruction system that captures an object which exist at the object side with a video camera, transmits a captured image to the terminal, and projects an annotation image instructed by an operator based on the captured image in the terminal onto the object with a projector of the object side. Also, there has been known a technique that improves visibility of an image such as the annotation image.

SUMMARY

According to an aspect of the present invention, there is provided an instruction system including: a capture device that captures a target area including an object; a projection device that projects an annotation image corresponding to an instruction on the basis of a captured image by the capture device, in the target area; a control device including: a judgment portion that judges visibility of the annotation image; a specifying portion that specifies a projection mode of the annotation image from projection modes of the annotation image stored into a storage portion, based on a result of the judgment by the judgment portion; a notification portion that notifies the projection mode specified by the specifying portion; and a projection control portion that causes the projection device to project the annotation image corresponding to an instruction on the basis of the projection mode notified from the notification portion; and a terminal including: a reception portion that receives the captured image, and the projection mode notified from the notification portion; and a transmission portion that transmits the instruction on the basis of the captured image received by reception portion, and the instruction on the basis of the notified projection mode, to the control device.

BRIEF DESCRIPTION OF THE DRAWINGS

Exemplary embodiments of the present invention will be described in detail based on the following figures, wherein:

FIG. 12 is a diagram showing an example of a projection mode table in a projection mode storage unit;

DETAILED DESCRIPTION

A description will now be given, with reference to the accompanying drawings, of exemplary embodiments of the present invention.

(First Exemplary Embodiment)

Figure 1:
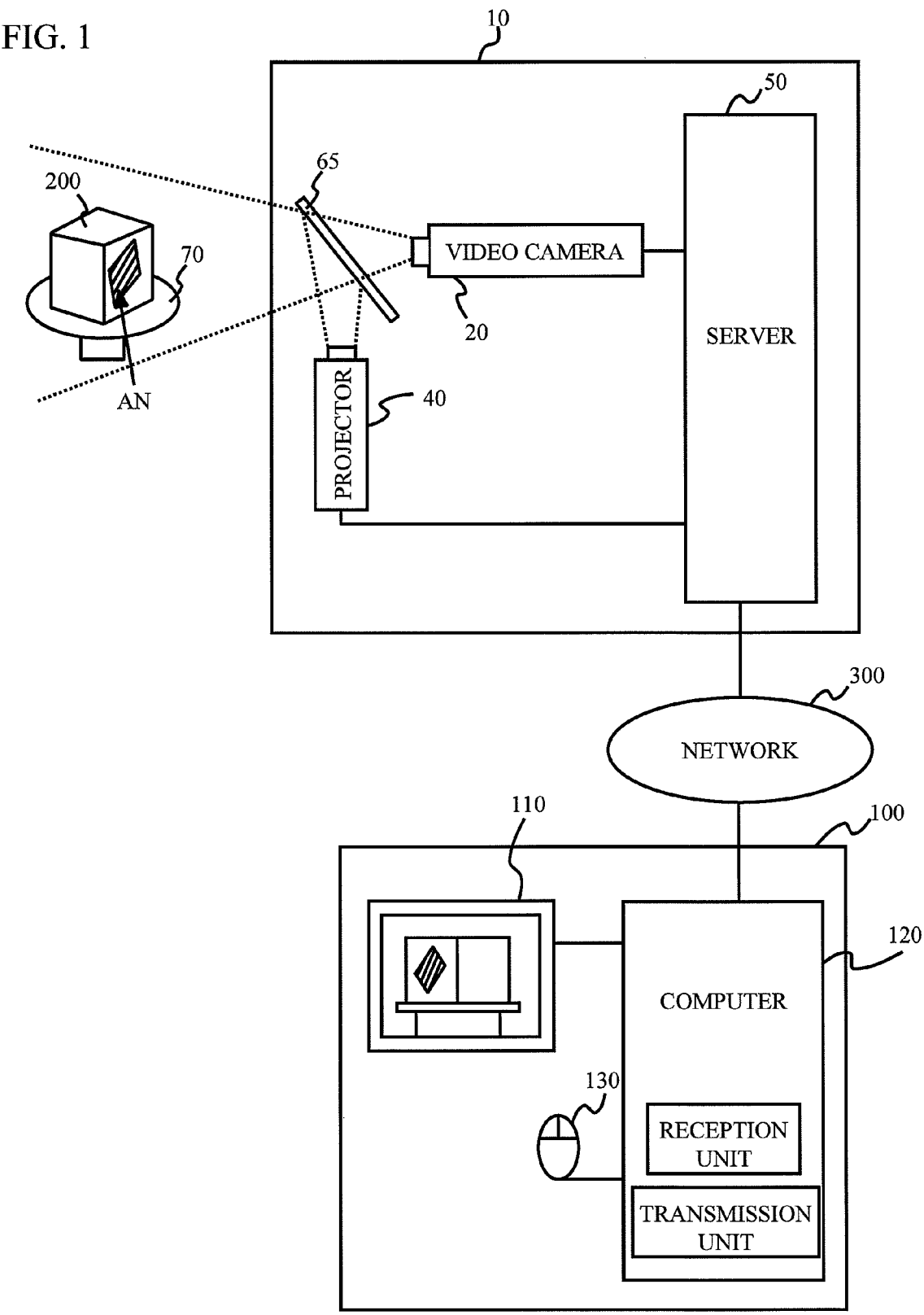
FIG. 1 is a diagram showing the structure of an instruction apparatus according to a first exemplary embodiment of the present invention.
Figure 2:
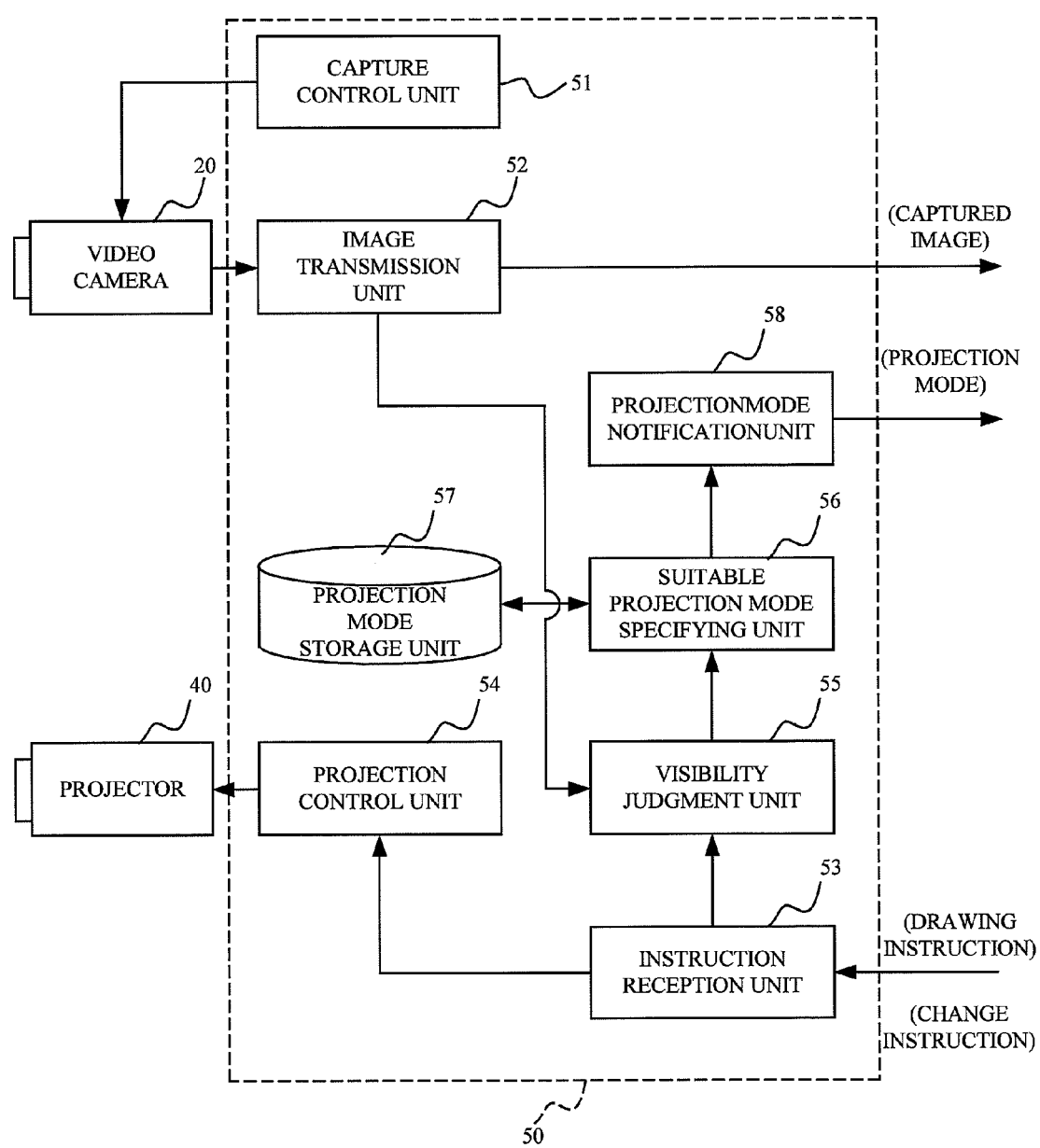
FIG. 2 is a block diagram showing the structure of substantial units in a server.
Figure 3:
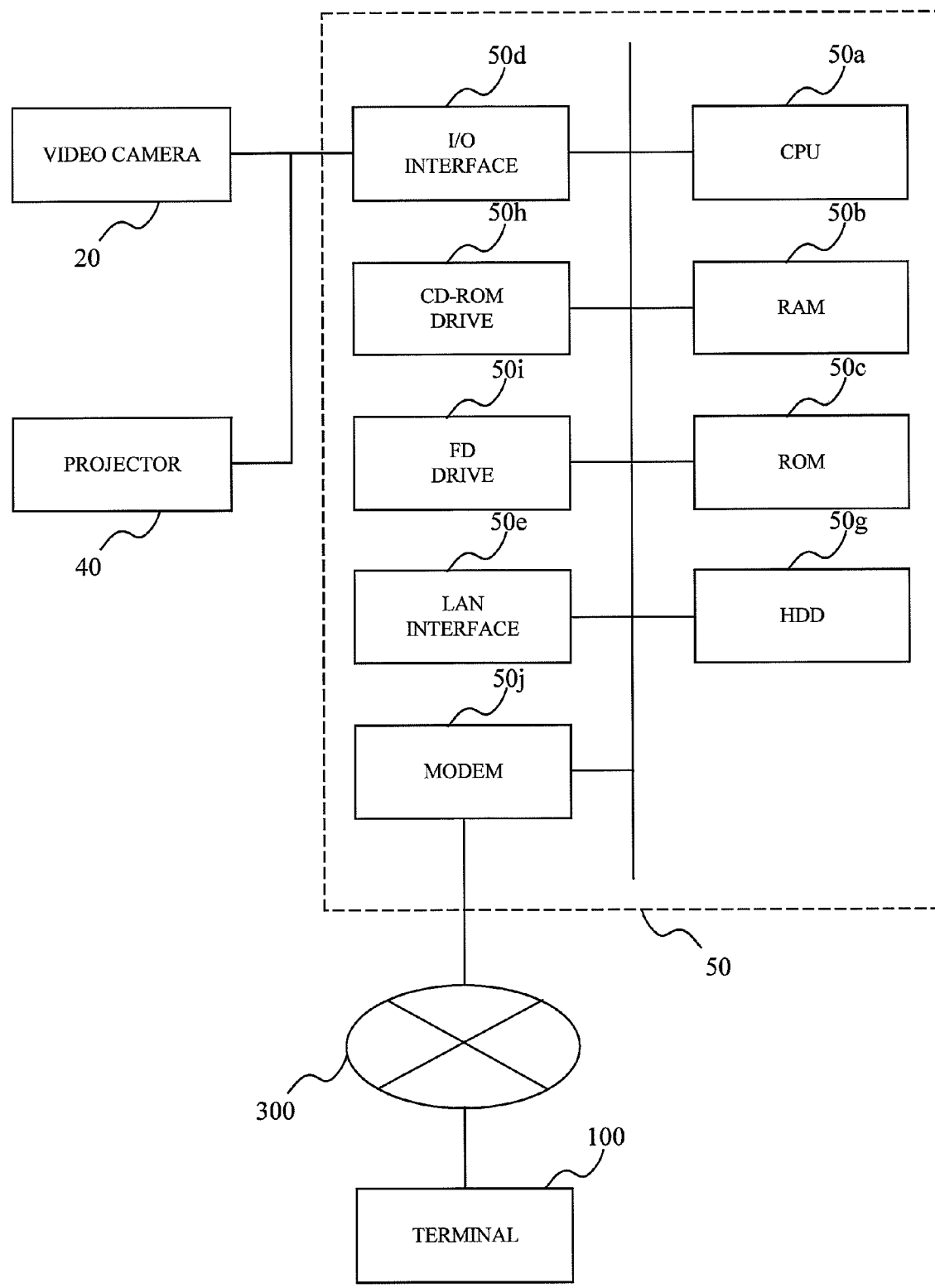
FIG. 3 is a block diagram showing an example of the hardware structure of the server.

FIG. 1 is a diagram showing the structure of an instruction apparatus according to a first exemplary embodiment of the present invention. FIG. 2 is a block diagram showing the structure of substantial units in a server 50. FIG. 3 is a block diagram showing an example of the hardware structure of the server 50.

As shown in FIG. 1, the instruction apparatus includes an object-side apparatus 10, a terminal 100, and so on. The object-side apparatus 10 and the terminal 100 are connected to each other via a network 300 such that they can communicate with one another. Although the single terminal 100 is shown in FIG. 1, plural terminals 100 and 101 (not shown) can be connected to a server 50 described hereinafter in the object-side apparatus 10 via the network 300.

The object-side apparatus 10 includes a video camera 20 as a capture device, a projector 40 as a projection device, the server 50 as a control device or an instruction apparatus, a half mirror 65, and so on.

The video camera 20 is composed of a CCD (Charge-Coupled Device) camera, for example, and captures an object 200 on a table 70. A captured image is taken in the server 50. It should be noted that the video camera 20 captures a transmission image that transmits the half mirror 65.

The projector 40 is composed of a liquid crystal projector, for example, and projects an annotation image AN corresponding to an instruction of the terminal 100 based on the captured image, onto the object 200. An optical system of the projector 40 is arranged such that an optical principal point of the projector 40 is substantially identical with that of the video camera 20 via the half mirror 65. The projector 40 projects the annotation image AN transmitted from the server 50 onto the object 200 via the optical system of the projector 40 and the half mirror 65. The annotation image AN from the projector 40 is reflected on the half mirror 65, and projected onto the object 200. It should be noted that the annotation image AN includes an image of any types such as a line, a character, a symbol, a figure, a color, and a font. It is preferable that the reflectivity of the half mirror 65 is about 0.3%.

The server 50 controls the operation of the video camera 20 and the projector 40, and transmits and receives various information to/from the terminal 100 via the network 300.

Specifically, as shown in FIG. 2, the server 50 includes: a capture control unit 51 that controls the video camera 20; an image transmission unit 52 that transmits the captured image from the video camera 20 to the terminal 100; an instruction reception unit 53 that receives various instructions such as a drawing instruction from the terminal 100; a projection control unit 54 that controls the projector 40, and causes the projector 40 to project the annotation image AN corresponding to an instruction based on a projection mode notified from a projection mode notification unit 58 as described hereinafter; a visibility judgment unit 55 that judges the visibility of the projected annotation image AN; a projection mode storage unit 57 that stores the projection modes of the annotation image AN; a suitable projection mode specifying unit 56 that specifies a suitable projection mode of the annotation image AN based on a result of the judgment by the visibility judgment unit 55; and a projection mode notification unit 58 that notifies the terminal 100 of the projection mode specified by the suitable projection mode specifying unit 56.

Therefore, the server 50 transmits the captured image from the video camera 20 to the terminal 100, and causes the projector 40 to project the annotation image AN corresponding to the instruction of the terminal 100 based on the captured image, onto the object 200. When the visibility of the annotation image AN is not acquired, the server 50 changes a present projection mode to the suitable projection mode, and causes the projector 40 to project the annotation image AN onto the object 200.

As shown in FIG. 3, the server 50 is achieved by the hardware structure in which a CPU 50a, a RAM 50b such as a SRAM (Static RandomAccessMemory), a DRAM (Dynamic RAM), a SDRAM (Synchronous DRAM), a NVRAM (Non Volatile RAM), a ROM (Read Only Memory) 50c such as a flash memory, an I/O interface 50d controlling the input and the output, a LAN interface 50e, and so on are connected to each other by a bus 50f.

Therefore, the CPU 50a reads out given programs stored into a storage device such as a ROM 50b and RAM 50c, and performs an arithmetical operation according to the programs, so that each function of the above-mentioned server 50 is achieved. A computer 120 as described hereinafter in the terminal 100 has the same structure as the server 50. It should be noted that processes in flowcharts as described hereinafter are achieved by executing such programs. As shown in FIG. 3, a HDD (Hard Disk Drive) 50g, a CD-ROM drive 50h, a FD drive 50i, and a modem 50j may be connected to the bus 50f according to need.

As shown in FIG. 1, the terminal 100 includes: a display device 110 composed of a liquid crystal display, a CRT (Cathode-Ray Tube) display, or the like; a computer 120 connected to the network 300; and a pointing device 130 (e.g. a mouse) connected to the computer 120. The operation of the display device 110 and the pointing device 130 is controlled by the computer 120.

The display device 110 displays the captured image transmitted from the object-side apparatus 10 on a display screen thereof. The pointing device 130 is used for an operation indicating the formation of the instruction with relation to the annotation image AN to be projected onto the object 200 so that an operator operates various buttons by a pointer in the display screen on which the captured image is displayed. The computer 120 includes a reception unit 121 that receives the captured image and the projection mode notified from the projection mode notification unit 58, and a transmission unit 122 that transmits various instructions such as the drawing instruction with relation to the annotation image AN drawn on the captured image.

Next, a description will now be given of the operation of the instruction system with reference to FIGS. 4 to 6.

First, a description will now be given of the operation of the object-side apparatus 10 with reference to FIG. 4.

Figure 4:
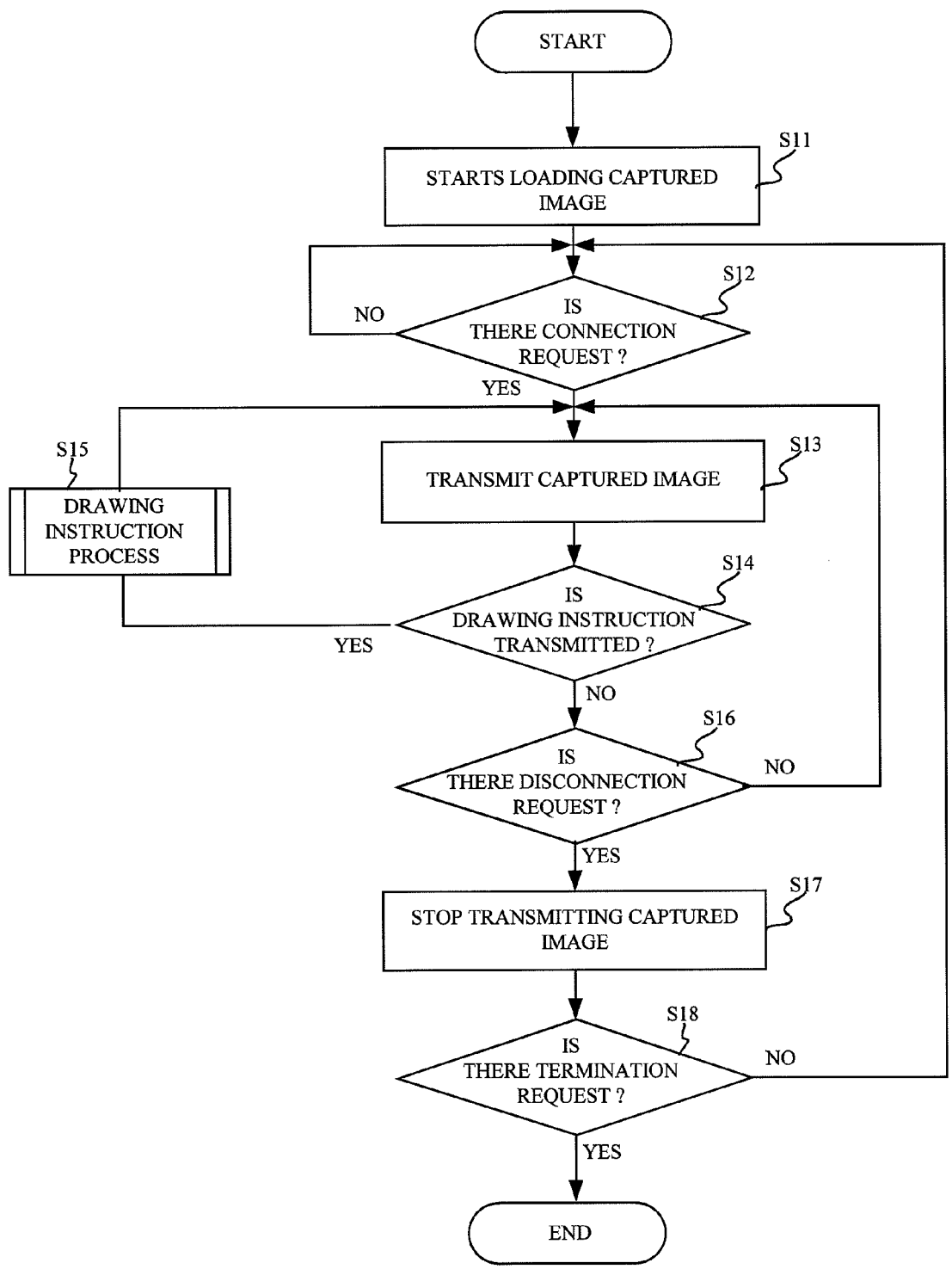
FIG. 4 is a flowchart showing an example of a process executed with the server which exists as an object side.

FIG. 4 is a flowchart showing an example of a process executed with the server 50 in the object-side apparatus 10.

As shown in FIG. 4, the server 50 starts loading the captured image from the video camera 20 (step S11), and judges whether there is a connection request from the computer 120 in the terminal 100 (step S12). When the answer to the judgment of step S12 is "YES", the server 50 transmits the captured image of the video camera 20 to the computer 120 in the terminal 100 via the network 300 (step S13).

Next, the server 50 judges whether the drawing instruction is transmitted from the computer 120 (step S14). The drawing instruction relates to draw the annotation image AN. When the answer to the judgment of step S14 is "YES", the server 50 executes a drawing instruction process depending on the contents of the drawing instruction (step S15). Specifically, the server 50 generates the annotation image AN depending on the drawing instruction, as the drawing instruction process. Thereby, the server 50 causes the projector 40 to project the annotation image AN onto the object 200 based on the results of the drawing instruction process.

On the other hand, when the answer to the judgment of step S14 is "NO", the server 50 judges whether there is a disconnection request from the computer 120 (step S16). When the answer to the judgment of step S16 is "NO", the procedure returns to step S13, and the server transmits a new captured image of the video camera 20 to the computer 120 in the terminal 100 via the network 300. When the answer to the judgment of step S16 is "YES", the server 50 stops transmitting the captured image of the video camera 20 (step S17). The server 50 judges whether there is a termination request of the present process (step S18). When the answer to the judgment of step S18 is "NO", the procedure returns to step S12, and the procedures of steps S12 to S17 are repeated. When the answer to the judgment of step S18 is "YES", the present process is terminated.

Next, a description will now be given of the operation of the terminal 100 with reference to FIGS. 5 and 6. FIG. 5 is a flowchart showing an example of a image forming process executed with the computer 120 in the terminal 100, and FIG.

6 is a diagram useful in explaining an example of the operation executed with the terminal 100.

Figure 5:
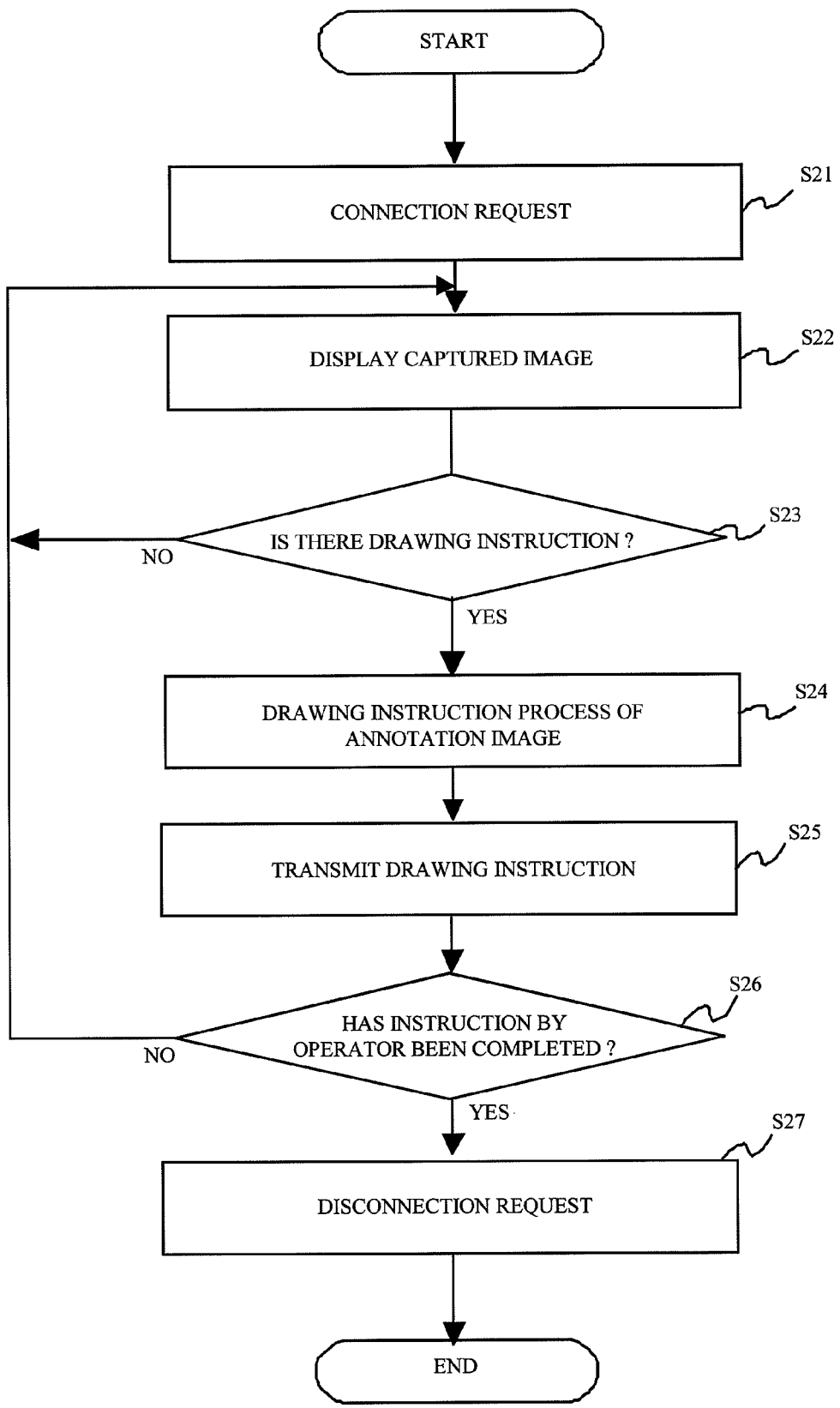
FIG. 5 is a flowchart showing an example of a image forming process executed with a terminal such as a computer.

First, as shown in FIG. 5, the computer 120 in the terminal 100 executes a connection request to the server 50 (step S21). Next, after the connection is completed, the computer 120 displays a captured image 111 transmitted from the server 50 of the object side on a screen of the display device 110, as shown in FIG. 6 for example (step S22). The captured image 111 shown in FIG. 6 indicates an image in which objects 200a and 200b on the table 70 are captured by the video camera 20 arranged above them.

Next, the computer 120 judges whether there is the drawing instruction of the annotation image AN to the captured image 111 displayed on the screen of the display device 110, from the operator (step S23). When the answer to the judgment of step S23 is "YES", the computer 120 executes a process depending on the drawing instruction (step S24).

Figure 6:
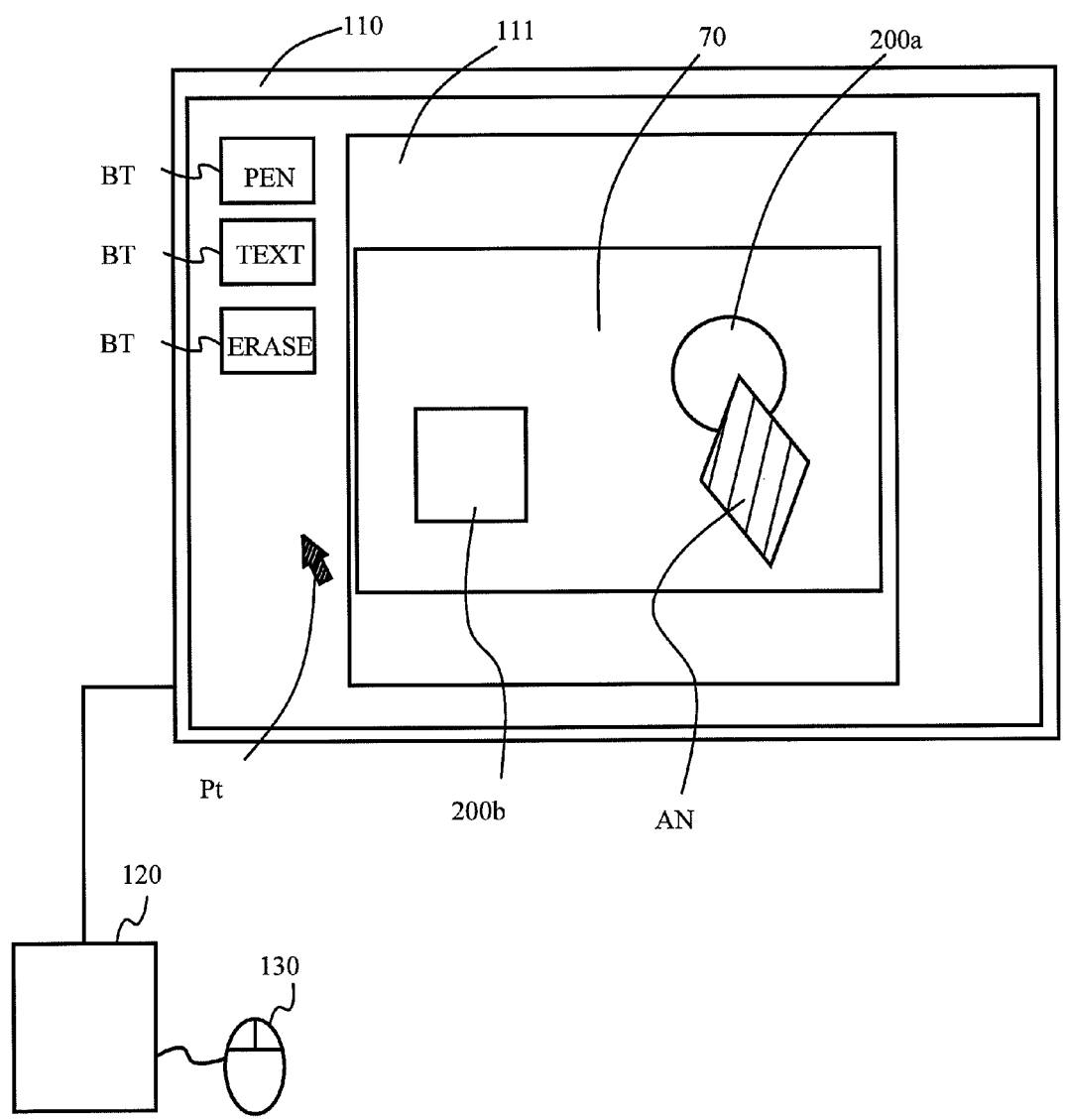
FIG. 6 is a diagram useful in explaining an example of the operation executed with the terminal.

Specifically, while viewing the captured image 111 displayed on the screen of the display device 110 as shown in FIG. 6, the operator of the terminal 100 moves a pointer Pt as an instruction image on the screen by operating the pointing device 130, and instructs the terminal 100 to draw the annotation image AN. Various buttons BT formed on the screen is operated with the pointing device 130, so that the instruction is executed.

The drawing instruction of the annotation image AN includes: an instruction to make the computer 120 draw a figure such as a polygon, a circle, a line segment, or an arrow; an instruction to make the projector 40 project a prepared bitmap image; an instruction to make the computer 120 draw a text image input from a keyboard or the like; an instruction to make the computer 120 draw an image in which the operation of the pointing device 130 is reflected; and other instruction. The computer 120 transmits the drawing instruction specified in step S24 to the server 50 (step S25).

Next, the computer 120 judges whether the instruction by the operator of the terminal 100 based on the captures image of the video camera 20 has been completed (step S26). When the answer to the judgment of step S26 is "YES", the computer 120 executes a disconnection request to the server 50 (step S27), and then the process is terminated. When the answer to the judgment of step S26 is "NO", the procedure returns to step S22, and the procedures of steps S22 to S26 are repeated.

A description will now be given of a process which changes the projection mode of the annotation image with reference to FIGS. 7 to 15.

First, a description will now be given of the operation of the visibility judgment unit 55 with reference to FIGS. 7 to 10.

Figure 7:
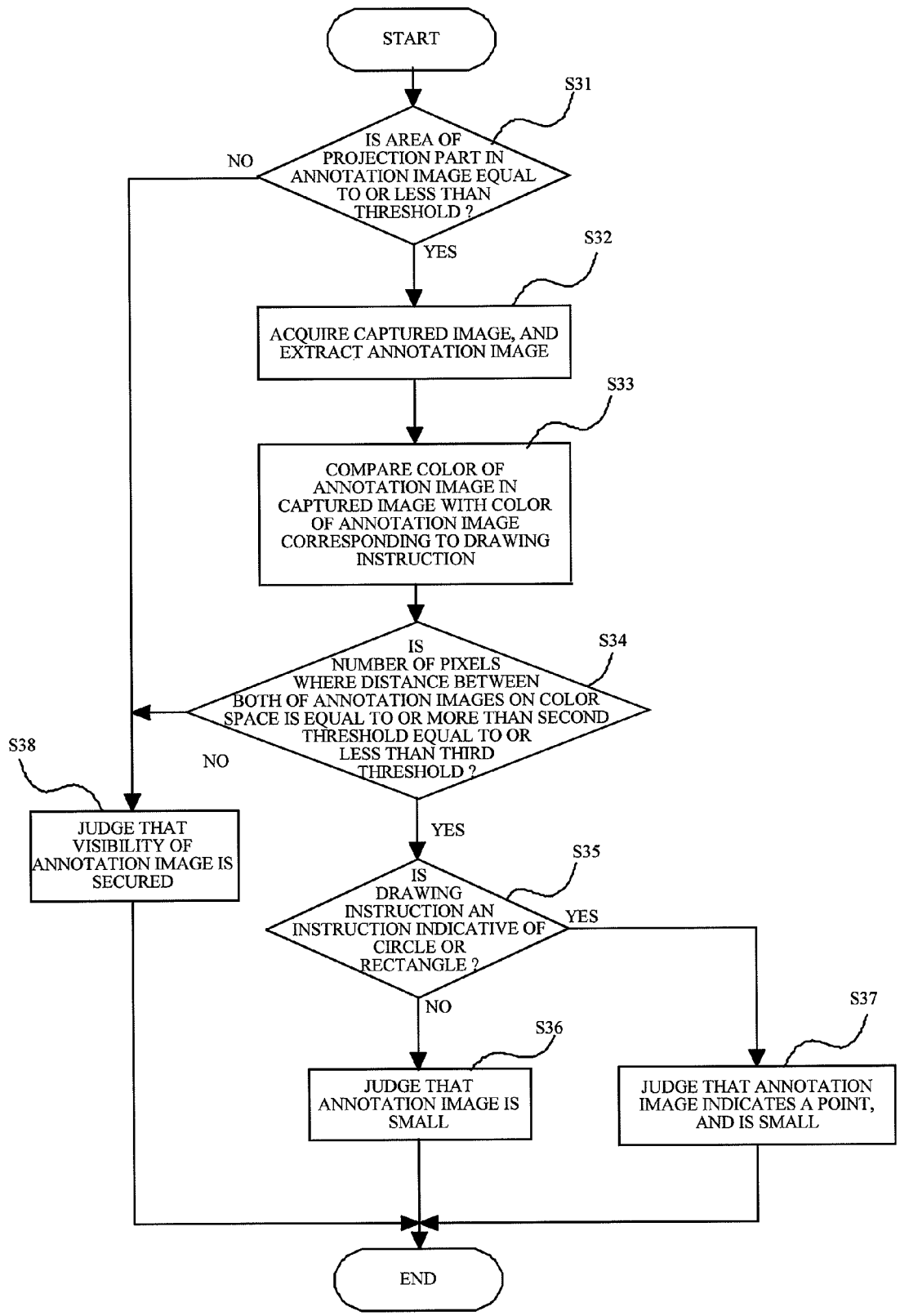
FIG. 7 is a flowchart showing an example of the operation of a visibility judgment unit in the server.
Figure 8A:
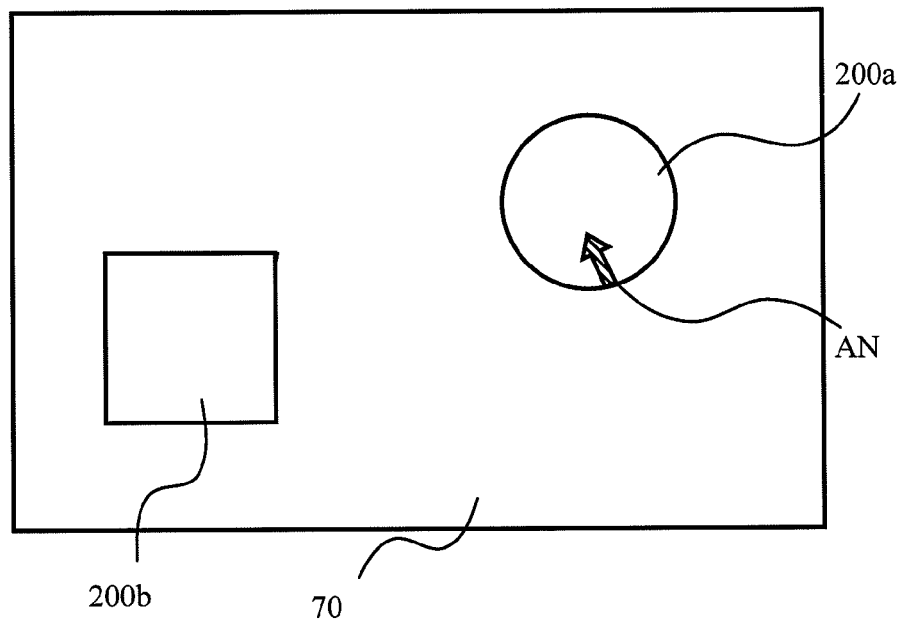
FIGS. 8A and 8B are diagrams showing examples in which an annotation image is projected.
Figure 8B:
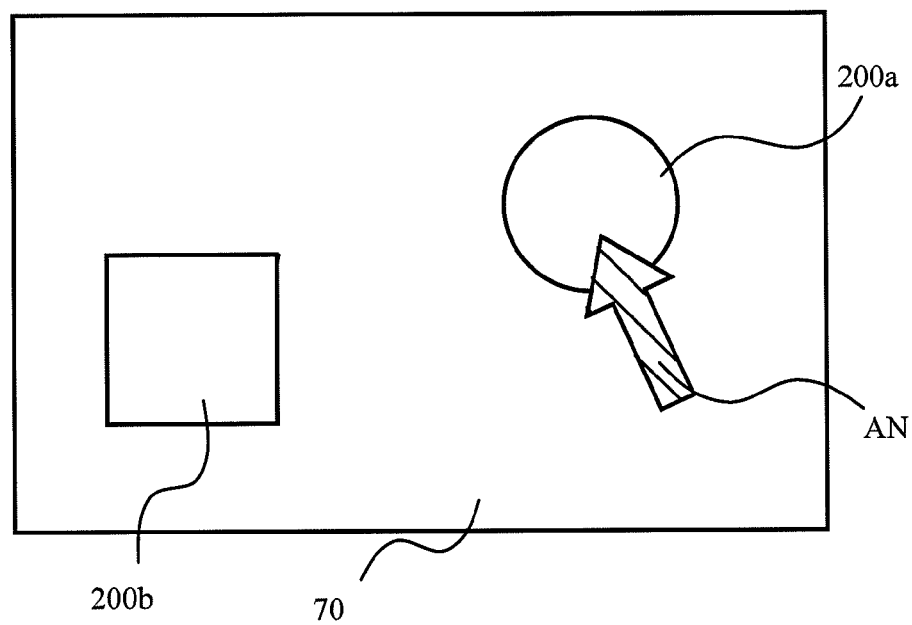
Figure 9A:
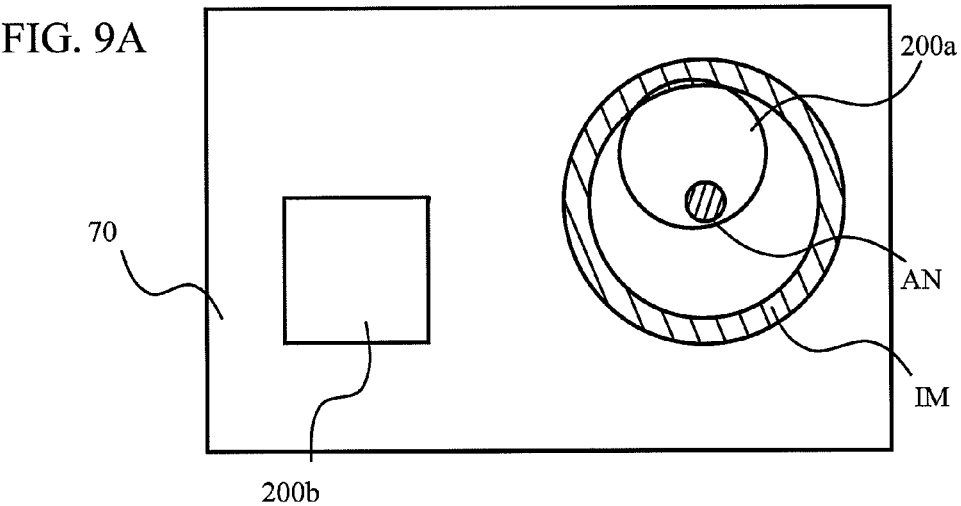
FIGS. 9A to 9C are diagrams showing other examples in which the annotation image is projected.
Figure 9B:
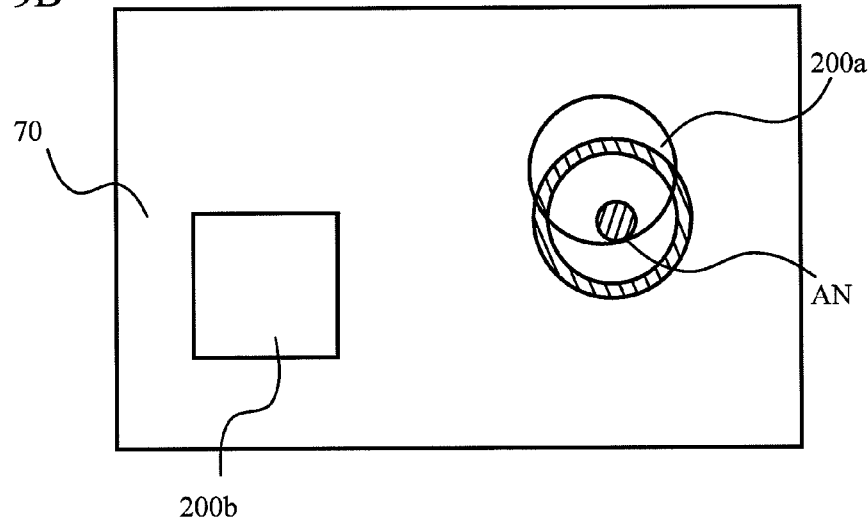
Figure 9C:
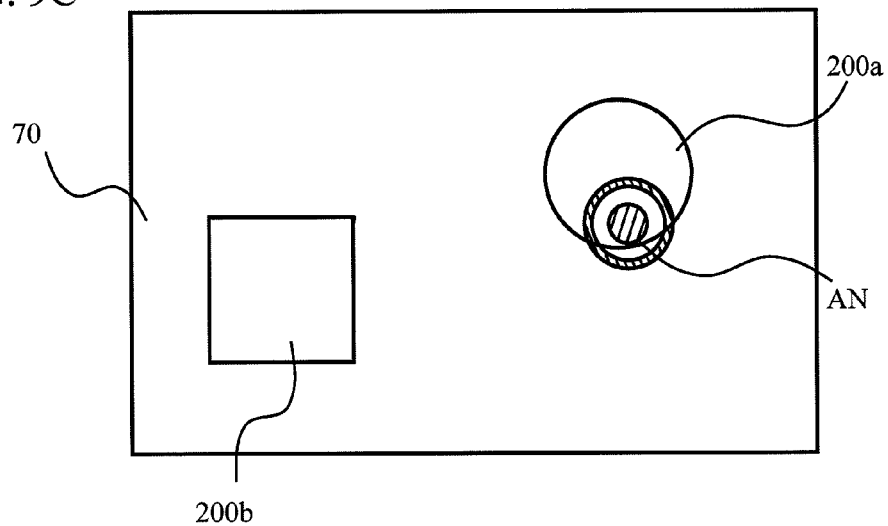
Figure 10:
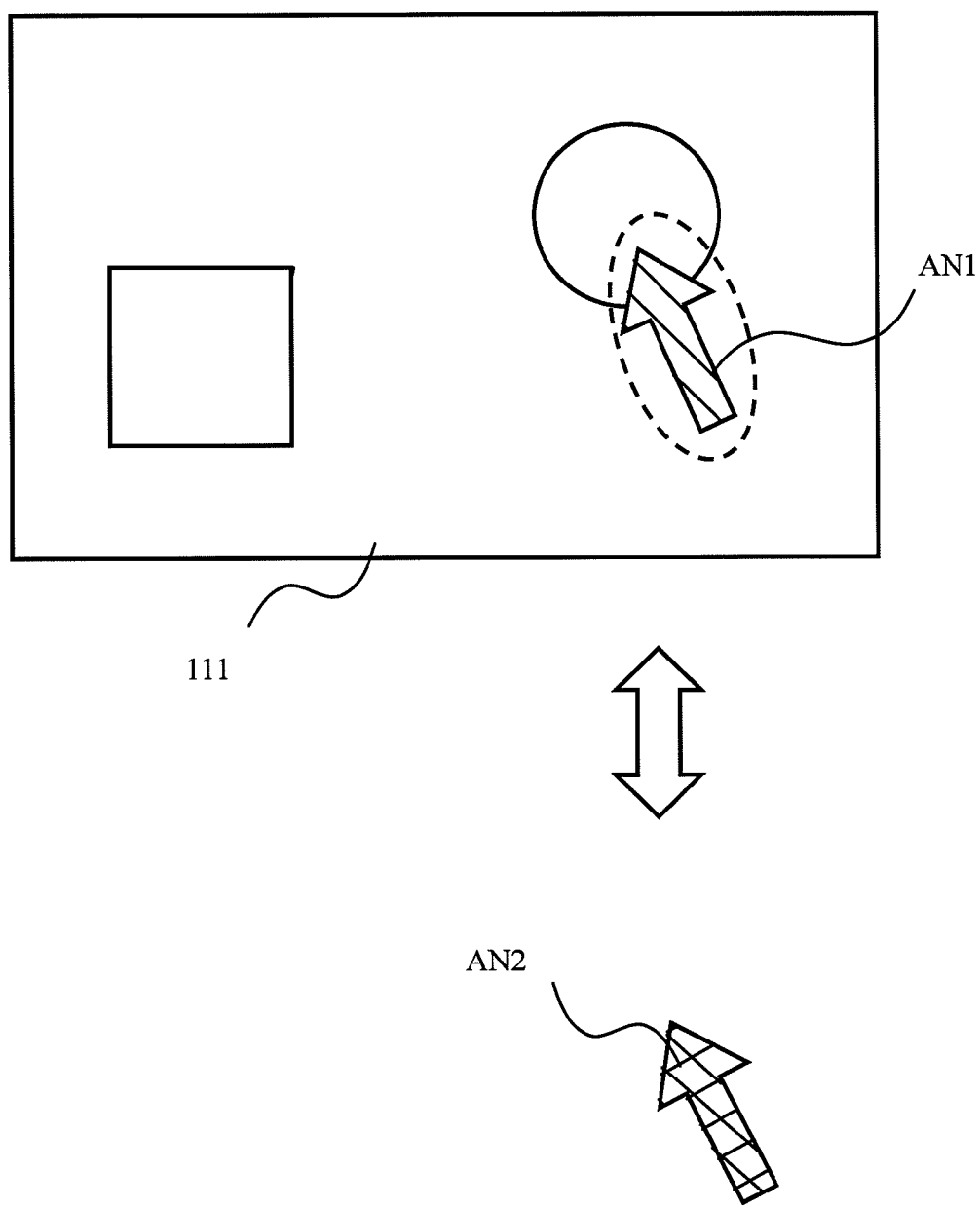
FIG. 10 is a diagram useful in explaining comparison between plural annotation images.

FIG. 7 is a flowchart showing an example of the operation of a visibility judgment unit 55 in the server 50. FIGS. 8A and 8B are diagrams showing examples in which the annotation image is projected. FIGS. 9A to 9C are diagrams showing other examples in which the annotation image is projected. FIG. 10 is a diagram useful in explaining comparison between plural annotation images. It is preferable that the flowchart shown in FIG. 7 is included in the process of step S15 shown in FIG. 4. Similarly, it is preferable that flowcharts described hereinafter are included in the process of step S15 shown in FIG. 4.

The visibility judgment unit 55 in the server 50 judges whether an area of a projection part in the annotation image AN is equal to or less than a first threshold (step S31). The first threshold is preset. For example, when the shape of the annotation image AN is an arrow as shown in FIG. 8A, the visibility judgment unit 55 judges whether the area of the arrow is equal to or less than the first threshold. Also, when the shape of the annotation image AN is a circle as shown in FIG. 9A, the visibility judgment unit 55 judges whether the area of the circle is equal to or less than the first threshold. A rectangle may be used on behalf of the circle as the annotation image AN.

When the answer to the judgment of step S31 is "YES", the visibility judgment unit 55 acquires the captured image, and extracts the annotation image AN from the captured image (step S32). The extraction process is executed by extracting a corresponding area based on a known position and a known size of the annotation image. The annotation image AN shown in FIG. 8A or 9A is extracted by the extraction process.

Next, the visibility judgment unit 55 compares a color of the annotation image AN extracted by the process of step S32 with that of the annotation image AN according to the drawing instruction every pixel (step S33). Specifically, as shown in FIG. 10, the visibility judgment unit 55 compares an image characteristic amount of an annotation image AN1 included in the captured image with an image characteristic amount of an annotation image AN2 as digital data according to the drawing instruction, by using a pattern matching method or the like.

The visibility judgment unit 55 judges whether the number of pixels where a distance between both of the annotation images (e.g. annotation images AN1 and AN2) on a color space is equal to or more than a second threshold is equal to or less than a third threshold (step S34). Specifically, first, the visibility judgment unit 55 applies both pixels included in both of the annotation images to the color space, and compares each pixel included in one annotation image with a corresponding pixel which is the same potion as each pixel, and is included in another annotation image. The visibility judgment unit 55 judges whether a distance between both pixels is equal to or more than the preset second threshold based on the results of the comparison. For example, when one pixel is "black" and another pixel is "white", it is very likely that these pixels are considerably away and a distance between these pixels is equal to or more than the preset second threshold. Then, the visibility judgment unit 55 counts the number of pixels equal to or more than the second threshold through the entire annotation images AN, and judges whether the result of the count is equal to or less than the third threshold. When the result of the count is equal to or less than the third threshold, the visibility judgment unit 55 judges that the colors of both annotation images AN are comparatively approximated, and specifies that the visibility of the annotation image AN in the captured image reduces by the size of the annotation image AN in the captured image being small.

Further, when the answer to the judgment of step S34 is "YES", the visibility judgment unit 55 judges whether the drawing instruction is an instruction in which the annotation image AN indicative of the circle or the rectangle is projected (step S35).

When the answer to the judgment of step S35 is "NO", the visibility judgment unit 55 judges that the annotation image AN in the captured image is small (step S36). For example, when the shape of the annotation image AN is the arrow as shown in FIG. 8A, the visibility judgment unit 55 judges that the shape of the annotation image AN is not the circle or the rectangle, and the annotation image AN in the captured image is small. At this time, it is desirable that identification information (e.g. "001") is added to the result of the judgment by the visibility judgment unit 55.

On the other hand, when the answer to the judgment of step S35 is "YES", the visibility judgment unit 55 judges that the annotation image AN in the captured image indicates a point or the like, and is small (step S37). For example, when the shape of the annotation image AN is the circle as shown in FIG. 9A, the visibility judgment unit 55 judges that the annotation image AN in the captured image indicates a point or the like, and is small. At this time, it is desirable that identification information (e.g. "002") is added to the result of the judgment by the visibility judgment unit 55.

When the answer to the judgment of step S31 or S34 is "NO", the visibility judgment unit 55 judges that the visibility of the annotation image AN in the captured image (i.e., the annotation image AN actually projected onto the object) is secured (step S38). At this time, it is desirable that identification information (e.g. "000") is added to the result of the judgment by the visibility judgment unit 55.

Next, a description will now be given of the operation of the suitable projection mode specifying unit 56 with reference to FIGS. 11 and 12.

Figure 11:
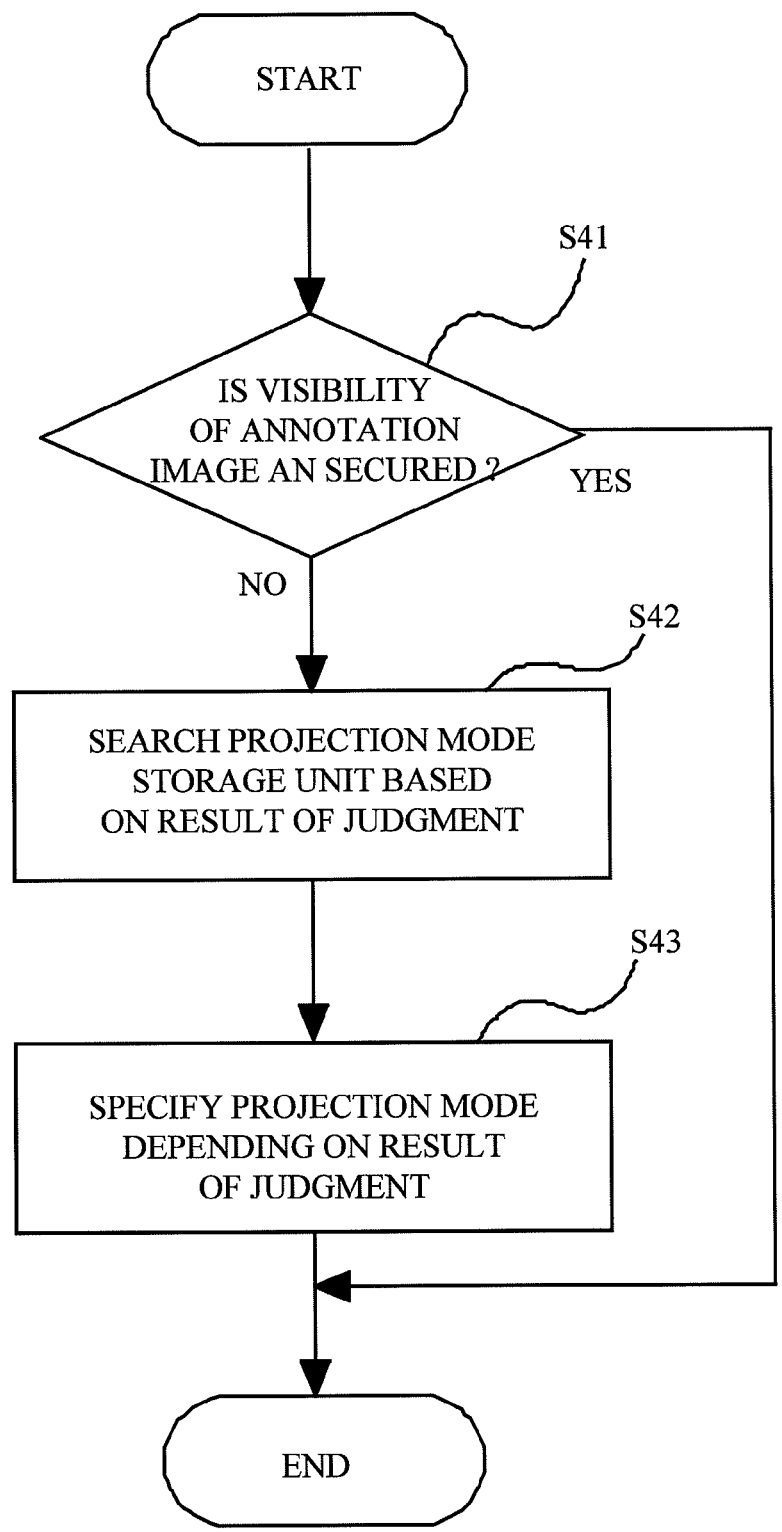
FIG. 11 is a flowchart showing an example of the operation of a suitable projection mode specifying unit in the server.

FIG. 11 is a flowchart showing an example of the operation of the suitable projection mode specifying unit 56 in the server 50, and FIG. 12 is a diagram showing an example of a projection mode table in the projection mode storage unit 57.

As shown in FIG. 12, the suitable projection mode specifying unit 56 judges whether the visibility of the annotation image AN in the captured image (i.e., the annotation image AN actually projected onto the object) is secured (step S41). For example, the suitable projection mode specifying unit 56 judges whether the above-mentioned identification information indicates "000", so that the judgment may be executed.

When the answer to the judgment of step S41 is "NO" (i.e., the above-mentioned identification information indicates "001", "002", or the like), the suitable projection mode specifying unit 56 searches the projection mode storage unit 57 based on the result of the judgment (step S42).

Next, the suitable projection mode specifying unit 56 specifies a projection mode depending on the result of the judgment (step S43). For example, when the identification information for the result of the judgment indicates "001", as shown in FIG. 12, the suitable projection mode specifying unit 56 specifies a projection mode "enlarge and project annotation image". When the identification information for the result of the judgment indicates "002", the suitable projection mode specifying unit 56 specifies a projection mode "project annotation image with moving image". These projection modes are properly stored into the projection mode storage unit 57 if necessary. It should be noted that, when there is not the projection mode for the result of the judgment, the suitable projection mode specifying unit 56 specifies no projection mode.

Next, a description will now be given of the operation of the projection mode notification unit 58 with reference to FIGS. 13 and 14.

Figure 13:
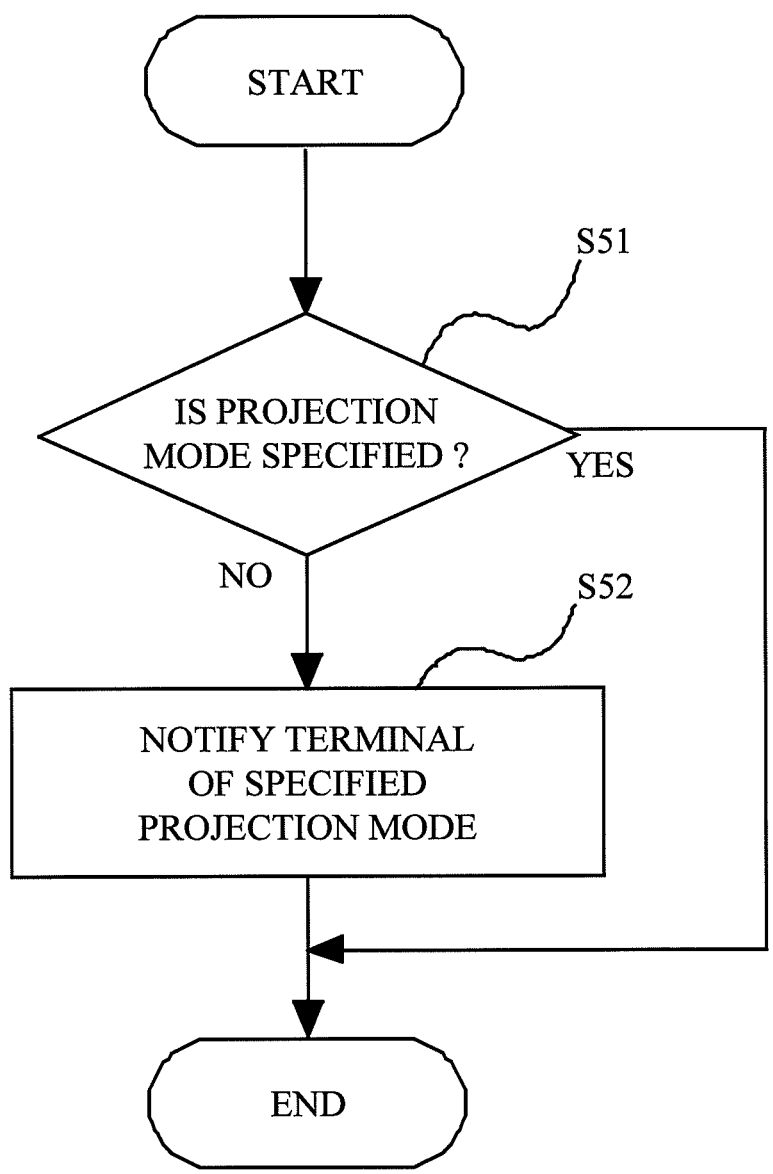
FIG. 13 is a flowchart showing an example of the operation of a projection mode notification unit in the server.
Figure 14:
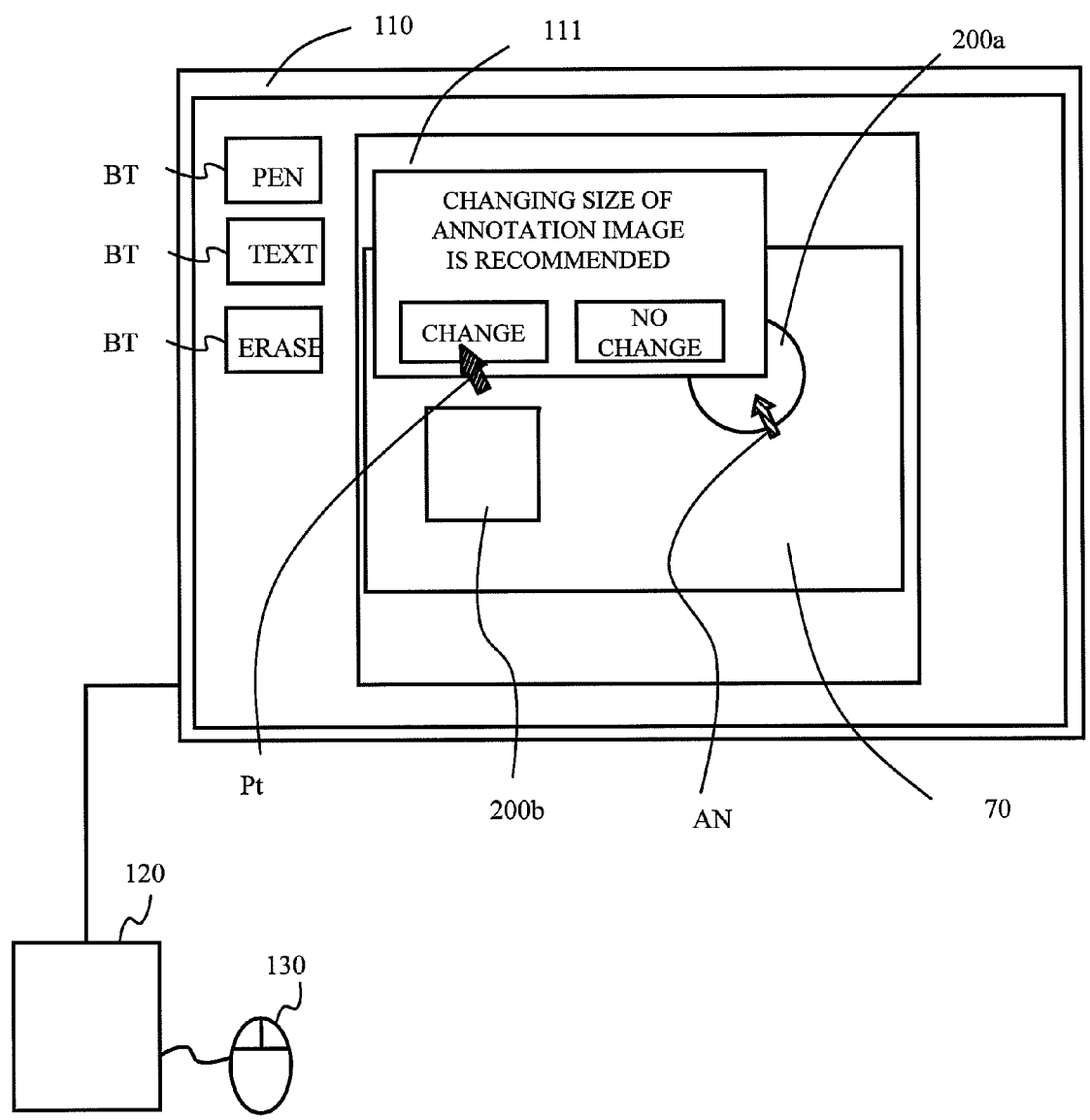
FIG. 14 is a diagram showing an example of display which recommends the change of a projection mode.

FIG. 13 is a flowchart showing an example of the operation of the projection mode notification unit 58 in the server 50, and FIG. 14 is a diagram showing an example of display which recommends the change of the projection mode.

As shown in FIG. 13, the projection mode notification unit 58 judges whether the projection mode is specified (step S51). The judgment is executed by whether the suitable projection mode specifying unit 56 has specified the projection mode.

When the answer to the judgment of step S51 is "YES", the projection mode notification unit 58 notifies the terminal 100 of the specified projection mode (step S52). As a result, a screen that recommends the change of the present projection mode is displayed on the screen of the display device 110, as shown in FIG. 14. According to FIG. 14, it is judged that the annotation image AN projected onto the object 200a is small, so that the screen that recommends changing a size of the annotation image AN is displayed.

In this case, when the operator of the terminal 100 operates the pointing device 130, moves the pointer Pt, and depresses a "change" button, for example, a change instruction indicative of the change from the present projection mode to the recommended projection mode is transmitted from the terminal 100 to the server 50. Conversely, when the operator of the terminal 100 depresses a "no change" button, a change instruction indicative of no change from the present projection mode to the recommended projection mode is transmitted from the terminal 100 to the server 50.

Next, a description will now be given of the operation of the instruction reception unit 53 and the projection control unit 54 with reference to FIGS. 8, 9, and 15.

Figure 15:
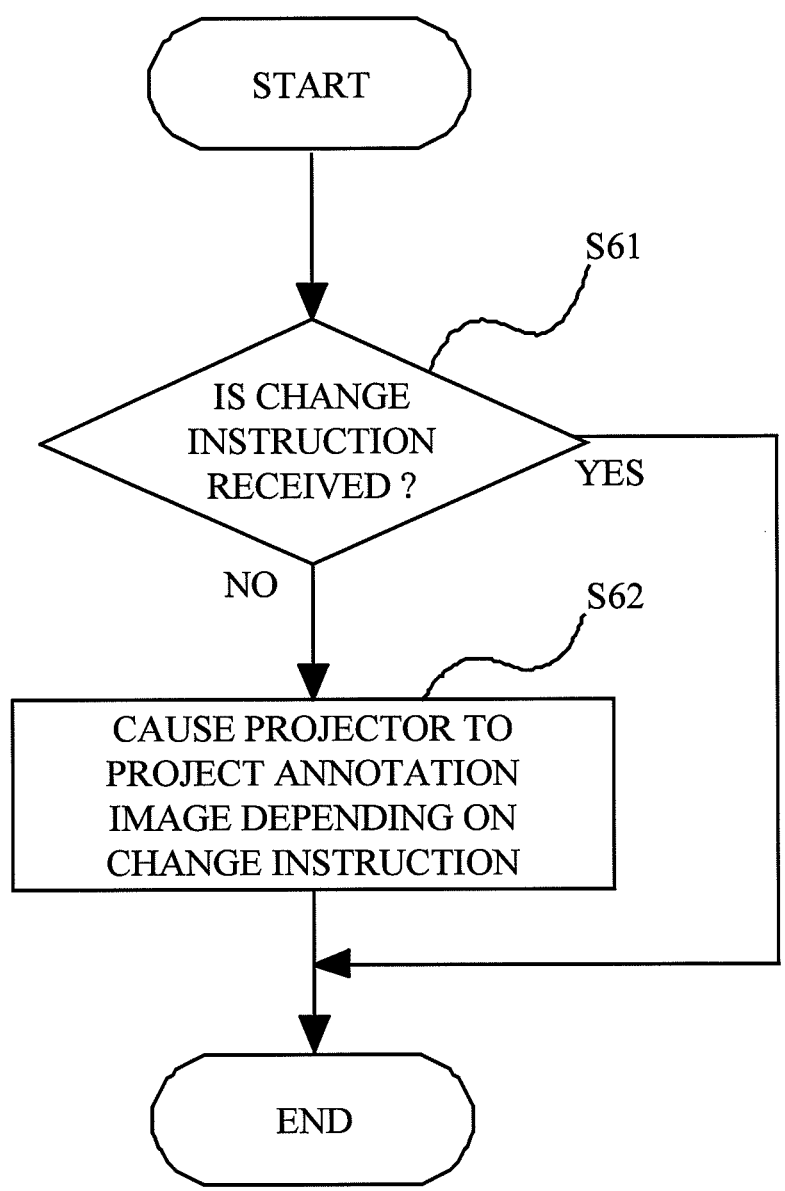
FIG. 15 is a flowchart showing an example of the operation of an instruction reception unit and a projection control unit.

FIG. 15 is a flowchart showing an example of the operation of the instruction reception unit 53 and the projection control unit 54.

First, the instruction reception unit 53 judges whether the change instruction is received from the terminal 100 (step S61). As described above, the judgment is executed by whether the change instruction indicative of change from the present projection mode to the recommended projection mode is received from the terminal 100. Therefore, when the instruction reception unit 53 receives the change instruction indicative of no change from the present projection mode to the recommended projection mode, the present process is terminated.

When the answer to the judgment of step S61 is "YES", the projection control unit 54 causes the projector 40 to project the annotation image depending on the change instruction (step S62).

For example, when it is judged that the annotation image AN projected onto the object 200a is small as shown in FIG. 8A, the projection control unit 54 causes the projector 40 to enlarge the size of the annotation image AN and project the enlarge annotation image AN onto the object 200a, as shown in FIG. 8B.

When the shape of the annotation image AN is the point, and it is judged that the annotation image AN is small, the projection control unit 54 causes the projector 40 to project an image IM enclosing the annotation image AN, as shown in FIG. 9A. Then, as shown in FIGS. 9B and 9C, the projection control unit 54 gradually reduce an enclosure of the image IM (i.e., a size of the image IM) to cause the operator to watch the annotation image AN. Thereby, the image IM becomes a moving image. After the image IM has become small to an extent that the image IM does not touch the annotation image AN, the projection control unit 54 returns a projection state of the image IM to an initial projection state, as shown in FIG. 9A (i.e., the projection control unit 54 returns the size of the image IM to that of an initial state, as shown in FIG. 9A). The shape of the image IM is not limited to the circle, but may be a rectangle, an ellipse, or the like.

(Second Exemplary Embodiment)

A description will now be given of a second exemplary embodiment with reference to FIGS. 16 to 18B.

Figure 16:
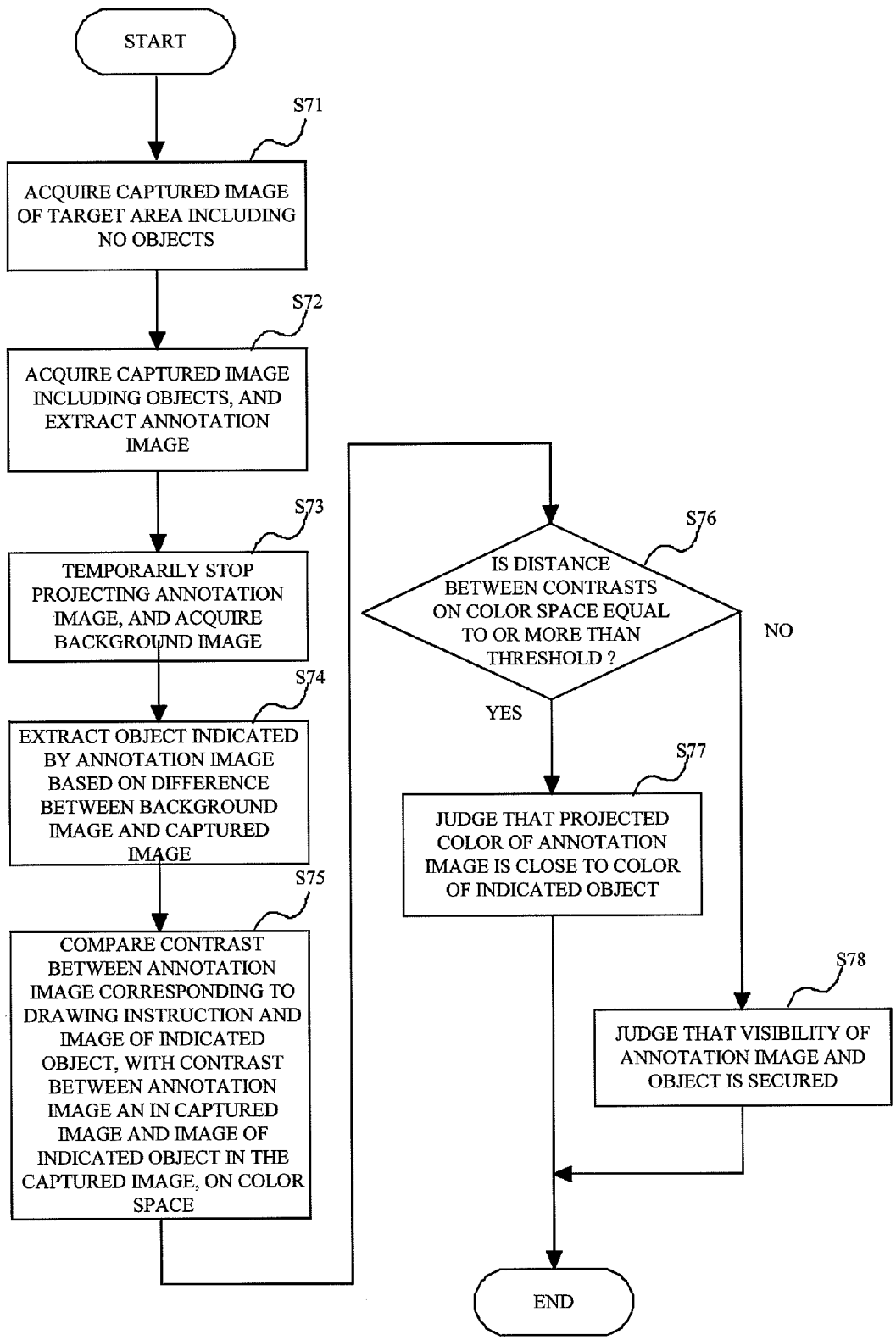
FIG. 16 is a flowchart showing another example of the operation of the visibility judgment unit according to a second exemplary embodiment of the present invention.
Figure 17A:
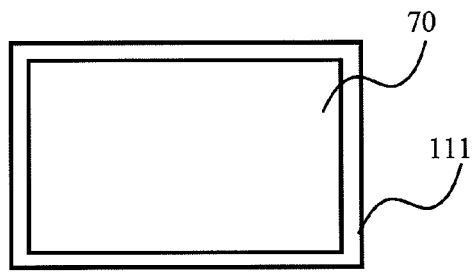
FIGS. 17A to 17G are diagrams useful in explaining comparison between plural annotation images.
Figure 17E:
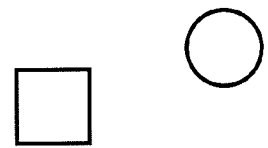
Figure 17B:
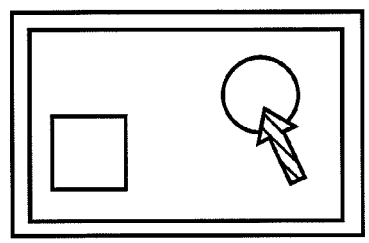
Figure 17F:
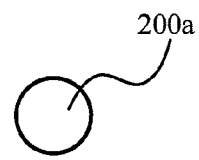
Figure 17C:
Figure 17G:
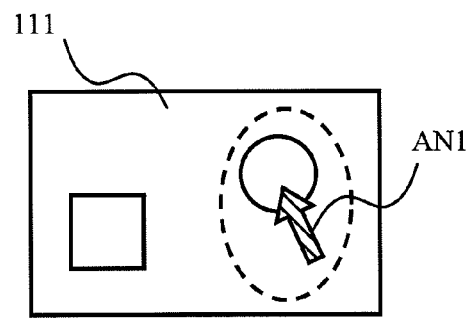
Figure 17D:
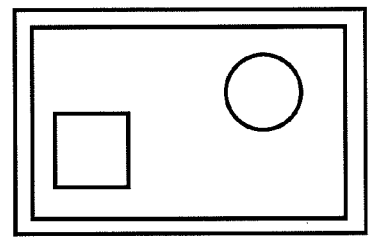
Figure 17D:
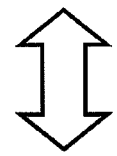
Figure 17D:
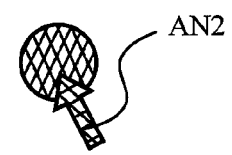
Figure 18A:
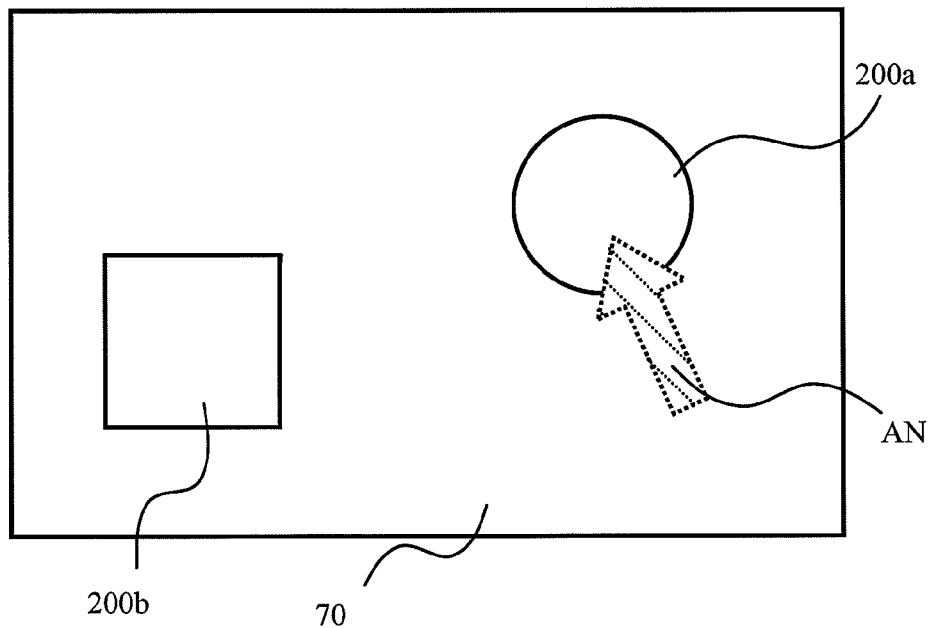
FIGS. 18A and 18B are diagrams showing examples in which the annotation image is projected before and after the projection mode changes.
Figure 18B:
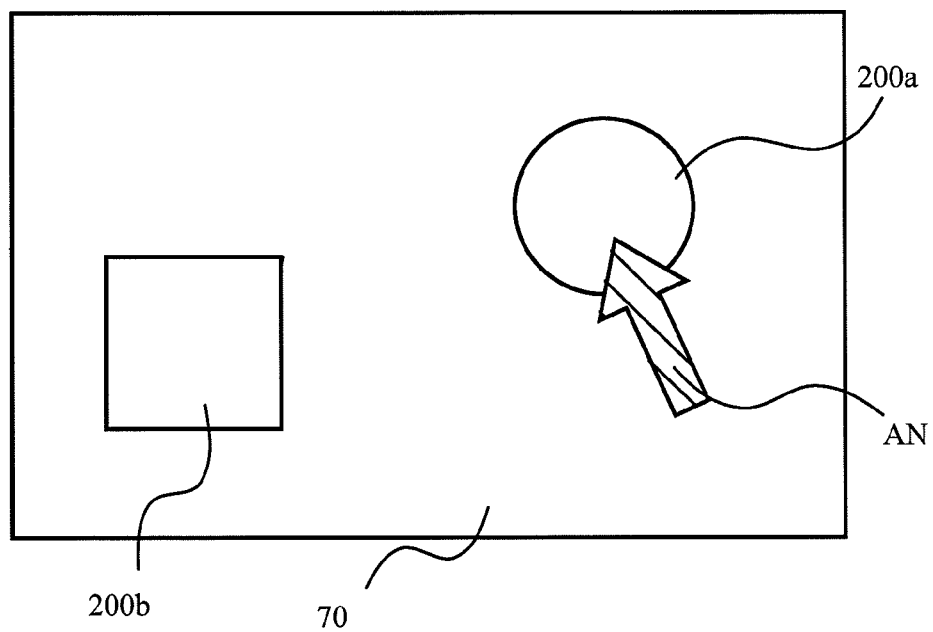

FIG. 16 is a flowchart showing another example of the operation of the visibility judgment unit 55. FIGS. 17A to 17G are diagrams useful in explaining a comparison process between plural annotation images. FIGS. 18A and 18B are diagrams showing examples in which the annotation image is projected before and after the projection mode changes.

The instruction system according to the exemplary embodiment is different from that according to the above-mentioned first exemplary embodiment in that the instruction system judges whether the visibility of the colors of the annotation image AN in the captured image and the object 200a indicated by the annotation image AN is secured by a combination of the colors of the annotation image AN corresponding to the drawing instruction and the object 200a in the captured image.

First, the visibility judgment unit 55 acquires an image in which a target area including the table 70 on which the objects 200a and 200b are not placed is captured, as shown in FIG. 16 (step S71). When there is the table 70 in the target area as shown in FIG. 17A, for example, the video camera 20 captures the target area, and acquires the captured image.

Next, the visibility judgment unit 55 acquires a captured image including the table 70 on which the objects 200a and 200b are placed, and the annotation image AN, and extracts the annotation image AN from the captured image (step S72). For example, when the annotation image AN is projected in the target area as show in FIG. 17B, the video camera 20 captures the target area. Then, the visibility judgment unit 55 extracts the annotation image AN from the captured image, as shown in FIG. 17C. The extraction process is executed by extracting a corresponding area in the captured image based on a known position and a known size of the annotation image.

The visibility judgment unit 55 temporarily stops projecting the annotation image AN, and acquires a background image (step S73). Thereby, the visibility judgment unit 55 acquires the background image as shown in FIG. 17D.

The visibility judgment unit 55 extracts the object indicated by the annotation image AN based on a difference between the background image and the captured image (step S74). Specifically, first, the visibility judgment unit 55 acquires images of the objects 200a and 200b as shown in FIG. 17E from the difference between the captured image including the table 70 acquired in step S71, as shown in FIG. 17A, and the background image acquired in step S73, as shown in FIG. 17D. Then, the visibility judgment unit 55 specifies the object 200a or 200b indicated by the annotation image AN by comparing the images of the objects 200a and 200b with the annotation image AN extracted in step S72, as shown in FIG. 17C. Since the position and the size of the extracted annotation image AN is known, the visibility judgment unit 55 judges whether the annotation image AN is overlapped on the object 200a or 200b based on the position and the size of the extracted annotation image AN, and coordinate values of the acquired images of the object 200a or 200b, whereby the visibility judgment unit 55 specifies the object 200a or 200b indicated by the annotation image AN. In this case, when the annotation image AN is overlapped on the object 200a, the object 200a represents the object indicated by the annotation image AN, as shown in FIG. 17F.

Next, the visibility judgment unit 55 compares a contrast between the annotation image AN corresponding to the drawing instruction and the image of the object 200a (hereinafter referred to as "indicated object 200a") extracted in step S74, with a contrast between the annotation image AN in the captured image and the image of the indicated object 200a in the captured image, every pixel on the color space. It should be noted that these contrasts correspond to image characteristic amounts. Specifically, as shown in FIG. 17G, the visibility judgment unit 55 compares the contrast between the annotation image AN1 and the image of the indicated object 200a in the captured image 111, with the contrast between the annotation image AN2 as digital data and the extracted image of the indicated object 200a.

The visibility judgment unit 55 judges whether a distance between the contrasts on the color space is equal to or more than a threshold set beforehand (step S76).

When the answer to the judgment of step S76 is "YES", the visibility judgment unit 55 judges that a projected color of the annotation image AN is close to or similar to a color of the indicated object 200a (step S77). At this time, it is desirable to add identification information (e.g. "003") to the result of the judgment.

On the other hand, when the answer to the judgment of step S76 is "NO", the visibility judgment unit 55 judges that the visibility of the annotation image AN and the object 200a is secured (step S78).

Thereby, the suitable projection mode specifying unit 56 specifies the projection mode depending on the result of the judgment of step S77. Specifically, the suitable projection mode specifying unit 56 specifies the projection mode "change of projected color" corresponding to the identification information "003", as shown in FIG. 12. Then, the projection control unit 54 causes the projector 40 to project the annotation image AN depending on the specified projection mode.

Therefore, when the contrast between the color of the annotation image AN and the color of the object 200a indicated by the annotation image AN is not large, the projection control unit 54 changes the color of the annotation image AN such that the contrast to the color of the object 200a becomes large. For example, it is desirable that the color of the annotation image AN is changed to a color that has a complementary-colors relationship for the color of object 200a. The color having the complementary-colors relationship indicates any one of a complementary color to the color of the object, and colors close to the complementary color. When the color of the object 200a is orange and the color of the annotation image AN is red, for example, the color of the annotation image AN is changed to blue, bruise blue, or blue-green. In this case, the blue corresponds to the complementary color to the color of the object (i.e., orange), and the bruise blue and the blue-green correspond to colors close to the complementary color (i.e., blue).

(Third Exemplary Embodiment)

A description will now be given of a third exemplary embodiment with reference to FIGS. 19 to 20B.

Figure 19:
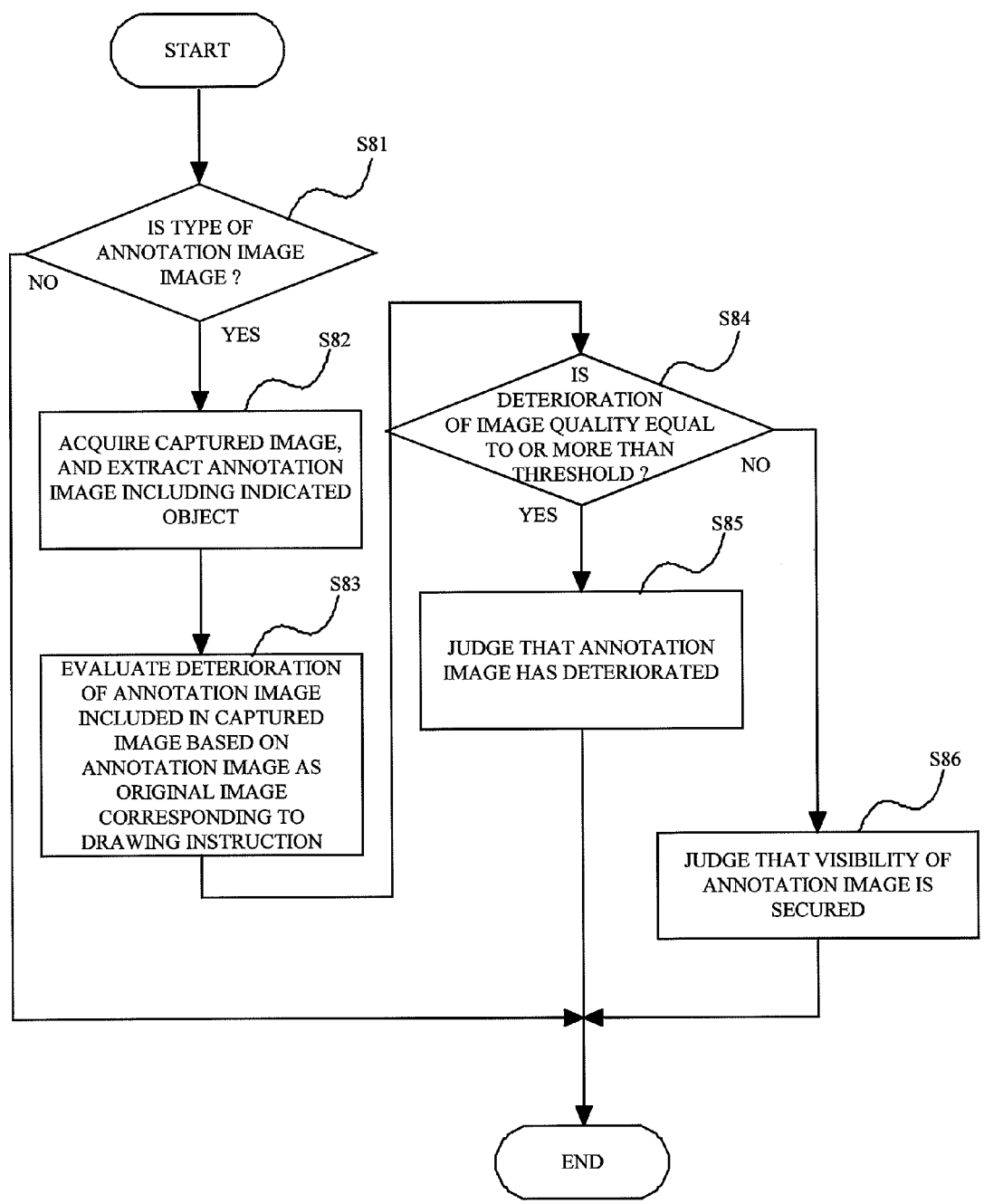
FIG. 19 is a flowchart showing the other example of the operation of the visibility judgment unit according to a third exemplary embodiment of the present invention.
Figure 20A:
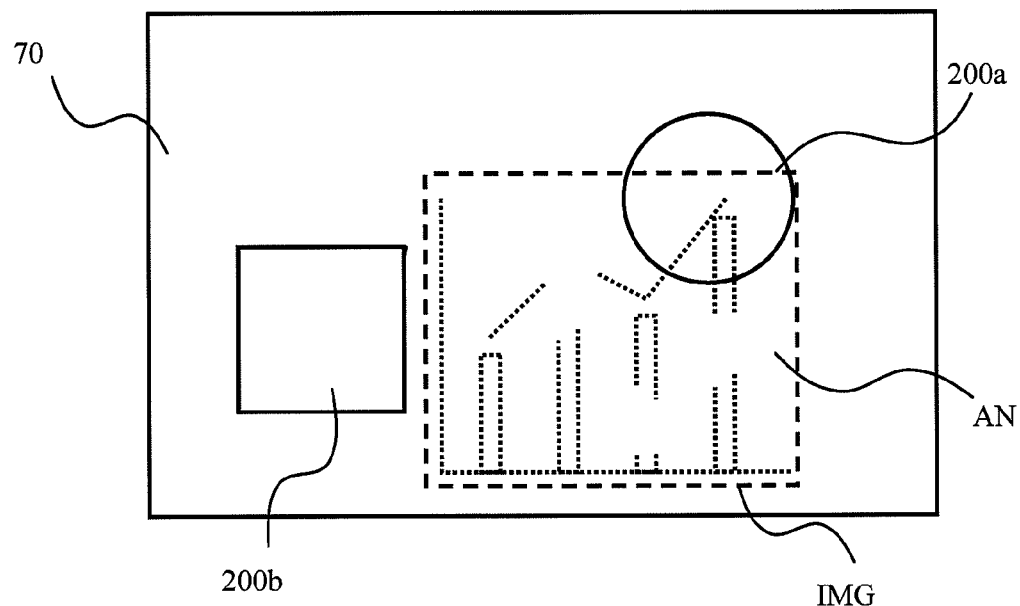
FIGS. 20A and 20B are diagrams showing examples in which the annotation image is projected before and after the projection mode changes.

FIG. 19 is a flowchart showing the other example of the operation of the visibility judgment unit 55 according to a third exemplary embodiment. FIGS. 20A and 20B are diagrams showing examples in which the annotation image is projected before and after the projection mode changes.

The instruction system according to the present exemplary embodiment is different from the above-mentioned first and second exemplary embodiments in that, when the annotation image AN such as a text or a chart projected in the target area has deteriorated, the instruction system changes the present projection mode to a projection mode which can inhibit the deterioration.

First, as shown in FIG. 19, the visibility judgment unit 55 judges whether a type of the annotation image AN is an image (step S81). The judgment is executed by judging whether the annotation image AN is composed of a prepared bitmap image. Here, the image includes a character, a character string, a chart, a graph, a photograph, or the like. It should be noted that the bitmap image is merely a single example, and an image format of the prepared image may be TIFF (Tag Image File Format), JPEG (Joint Photographic Experts Group), or the like.

When the answer to the judgment of step S81 is "YES", the visibility judgment unit 55 acquires the captured image, and extracts a projected image such as a chart from the captured image (step S82). The extraction process is executed by extracting a corresponding area based on a known position and a known size of the annotation image.

Next, the visibility judgment unit 55 compares the image as digital data corresponding to the drawing instruction with the image extracted in step S82, and evaluates the deterioration of image quality of the extracted image (step S83). As an evaluation method, a well-known method such as PSNR (Peak Signal to Noise Ratio) may be used, for example.

The visibility judgment unit 55 judges whether the deterioration of image quality is equal to or more than a threshold set beforehand (step S84).

When the answer to the judgment of step S84 is "YES", the visibility judgment unit 55 judges that the projected image has deteriorated (step S85). At this time, it is desirable to add identification information (e.g. "004") to the result of the judgment.

On the other hand, when the answer to the judgment of step S84 is "NO", the visibility judgment unit 55 judges that the visibility of the projected image is secured (step S86).

Thereby, the suitable projection mode specifying unit 56 specifies the projection mode depending on the result of the judgment of step S85. Specifically, the suitable projection mode specifying unit 56 specifies the projection mode corresponding to the identification information "004". The specified projection mode includes, for example, any one of projection modes indicative of "change the size of the (annotation) image", "move the (annotation) image to a position where the contrast between the (annotation) image and the object is good", "retransmit the (annotation) image having a high resolution", "project only the ROI (Region of Interest) in the target area", and the like. These projection modes are properly stored into the projection mode storage unit 57. Then, the projection control unit 54 causes the projector 40 to project the annotation image AN depending on the specified projection mode.

Figure 20B:
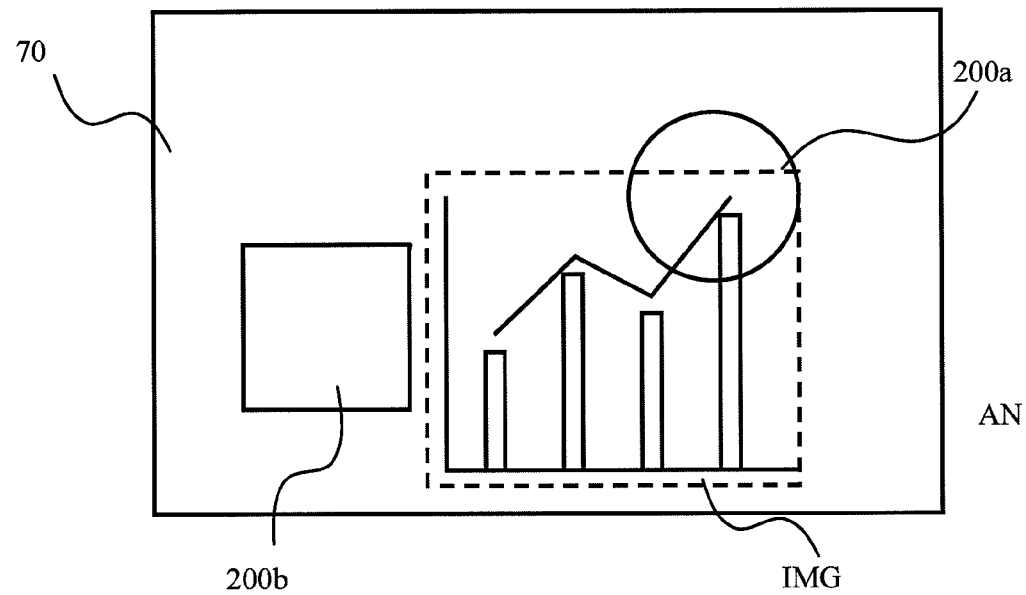

Specifically, when the image quality of an image IMG indicative of a graph is not preferable by the deterioration, as shown in FIG. 20A, i.e., when the deterioration of image quality is equal to or more than the threshold set beforehand, the projection control unit 54 changes the present projection mode to the specified projection mode in which the image quality of an image IMG indicative of a graph becomes preferable, as shown in FIG. 20B. In FIG. 20B, the projection control unit 54 retransmits an image indicative of the graph having a high resolution to the projector 40, and causes the projector 40 to project the retransmitted image.

Although the preferable exemplary embodiments are described in detail, the present invention is not limited to those exemplary embodiments, and various modifications may be made to them without departing from the scope of the invention. The present invention is achieved by providing a program for the instruction system by a communication means, and providing a recording medium storing the program for the instruction system. For example, in the instruction system, the servers according to the above-mentioned exemplary embodiments may be selectively combined with each other.

Figure 21:
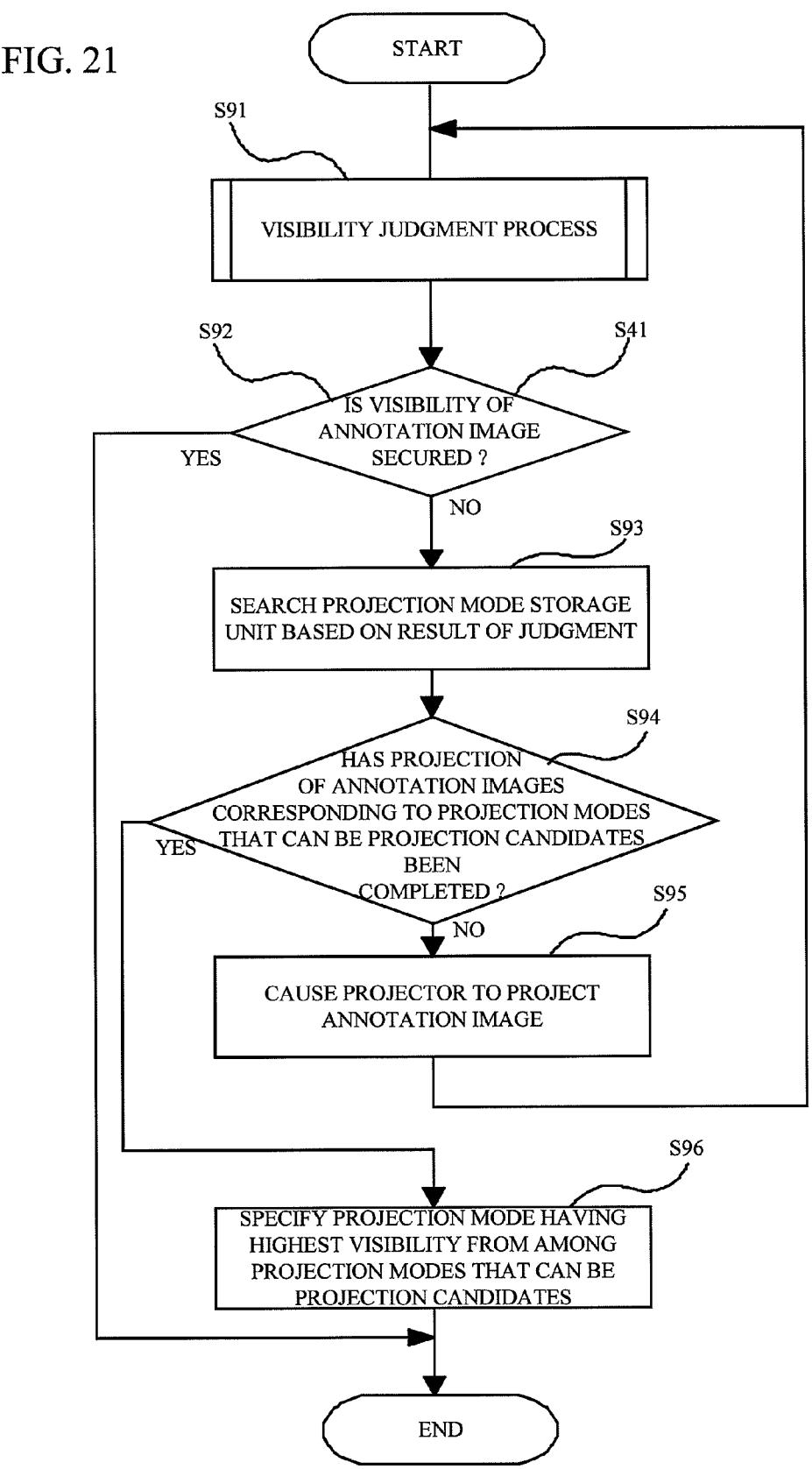
FIG. 21 is a flowchart showing an example of the operation of the suitable projection mode specifying unit.

In the second and third exemplary embodiments, the operation of the suitable projection mode specifying unit 56 may be changed. Specifically, as shown in FIG. 21, the suitable projection mode specifying unit 56 judges whether the visibility of the annotation image is secured in step S92, searches the projection mode storage unit 57 based on the result of the judgment (step S93), causes the projector 40 to sequentially project the annotation images AN corresponding to the projection modes that can be projection candidates depending on the result of the search (steps S94 and S95), and executes a visibility judgment process (step S91). Then, when the projection of the annotation images AN corresponding to the projection modes that can be the projection candidates is completed, the suitable projection mode specifying unit 56 specifies the projection mode having the highest visibility from among the projection modes that can be the projection candidates (step S96). In this case, the projection control unit 54 causes the projector 40 to sequentially project the annotation image AN having a color with a strong hue contrast from among the annotation images AN having the colors included in the complementary-colors relationship.

When the annotation image AN which has the complementary-colors relationship to the color of the object, and the color with the strong hue contrast is recommended, it is desirable that other candidate of the projection mode is recommended to the operator who does not want the color with the strong hue contrast. Also, in the annotation image such as the graph, a position where the annotation image is projected may be changed, and the size of the annotation image may be changed. For example, the projection control unit 54 may change a position where the annotation image is projected, to cause the projector 40 to sequentially project the annotation image AN having a color with a strong hue contrast onto positions of the colors included in the complementary-colors relationship. It should be noted that the hue contrast indicates a contrast effect caused when the colors with different hue are combined.

What is claimed is:

1. An instruction system comprising:
    a capture device that captures a target area including an object;
    a projection device that projects an annotation image corresponding to an instruction on the basis of a captured image by the capture device, in the target area;
    a control device including:
    a judgment portion that judges visibility of the annotation image;
    a specifying portion that specifies a projection mode of the annotation image from projection modes of the annotation image stored into a storage portion, based on a result of the judgment by the judgment portion;
    a notification portion that notifies the projection mode specified by the specifying portion; and
    a projection control portion that causes the projection device to project the annotation image corresponding to an instruction on the basis of the projection mode notified from the notification portion; and
    a terminal including:
    a reception portion that receives the captured image, and the projection mode notified from the notification portion; and
    a transmission portion that transmits the instruction on the basis of the captured image received by reception portion, and the instruction on the basis of the notified projection mode, to the control device.

2. The instruction system according to claim 1, wherein the judgment portion judges the visibility of the annotation image included in the captured image, by comparing an image characteristic amount of the annotation image corresponding to the instruction on the basis of the captured image with an image characteristic amount of the annotation image included in the captured image.

3. The instruction system according to claim 1, wherein the judgment portion judges the visibility of the annotation image included in the captured image, by comparing image characteristic amounts of the annotation image corresponding to the instruction on the basis of the captured image and an object included in the captured image indicated by the annotation image corresponding to the instruction, with image characteristic amounts of the annotation image included in the captured image and an object included in the captured image indicated by the annotation image included in the captured image.

4. The instruction system according to claim 1, wherein when the judgment portion judges that the visibility of the annotation image included in the captured image is not secured, the projection control portion enlarges a size of the annotation image corresponding to the instruction on the basis of the captured image, and causes the projection device to project the enlarged annotation image.

5. The instruction system according to claim 1, wherein when the judgment portion judges that a shape of the annotation image included in the captured image is a circle or rectangle, and the visibility of the annotation image included in the captured image is not secured, the projection control portion causes the projection device to project a moving image that causes an operator to watch the annotation image included in the captured image.

6. The instruction system according to claim 1, wherein when the judgment portion judges that a color of the annotation image included in the captured image is close to a color of an object indicated by the annotation image, the projection control portion changes a color of the annotation image corresponding to the instruction on the basis of the captured image to a color having a complementary-colors relationship to the color of the object, and causes the projection device to project the annotation image having the changed color.

7. The instruction system according to claim 6, wherein the projection control portion causes the projection device to sequentially project the annotation image having a color with a strong hue contrast from among the annotation images having colors included in the complementary-colors relationship.

8. The instruction system according to claim 1, wherein when the judgment portion judges that the image quality of the annotation image included in the captured image has deteriorated, the projection control portion causes the projection device to project a region of interest of the annotation image included in the captured image.

9. The instruction system according to claim 8, wherein the projection control portion causes the projection device to sequentially project the annotation image having a color with a strong hue contrast onto positions of the colors included in a complementary-colors relationship.

10. The instruction system according to claim 1, wherein when the instruction on the basis of the projection mode transmitted from the transmission portion makes a denial of the projection mode, the projection control portion causes the projection device to stop projecting the annotation image corresponding to the instruction on the basis of the projection mode.

11. An instruction apparatus comprising:
a judgment portion that judges visibility of the annotation image corresponding to an instruction on the basis of a captured image by a capture device, the capture device capturing a target area including an object;
a specifying portion that specifies a projection mode of the annotation image from projection modes of the annotation image stored into a storage portion, based on a result of the judgment by the judgment portion;
a notification portion that notifies the projection mode specified by the specifying portion; and
a projection control portion that causes a projection device to project the annotation image corresponding to an instruction on the basis of the projection mode notified from the notification portion, in the target area.

12. A non-transitory computer readable medium causing a computer to execute a process, the process comprising:
judging visibility of the annotation image corresponding to an instruction on the basis of a captured image by a capture device, the capture device capturing a target area including an object;
specifying a projection mode of the annotation image from projection modes of the annotation image stored into a storage portion, based on a result of the judgment;
notifying the specified projection mode; and
causing a projection device to project the annotation image corresponding to an instruction on the basis of the notified projection mode, in the target area.

* * * * *